US009452691B2

(12) United States Patent
Löfstrand

(10) Patent No.: US 9,452,691 B2
(45) Date of Patent: *Sep. 27, 2016

(54) TRANSPORTATION APPARATUS AND METHOD FOR CARRYING A PAYLOAD IN A DESIRED PLANE INDEPENDENT OF 3D TILTING OF SAID APPARATUS

(71) Applicants: Zouce AB, Västerås (SE); KIPAX AB, Helsingborg (SE)

(72) Inventor: Mikael Löfstrand, Västerås (SE)

(73) Assignees: Zoomability AB, Västerås (SE); KIPAX AB, Helsingborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/031,068

(22) Filed: Sep. 19, 2013

(65) Prior Publication Data

US 2014/0019011 A1   Jan. 16, 2014

Related U.S. Application Data

(63) Continuation of application No. 13/106,291, filed on May 12, 2011, now Pat. No. 8,565,982.

(30) Foreign Application Priority Data

Nov. 12, 2008   (SE) .................................. 0850075-3
Nov. 12, 2009   (WO) ................. PCT/SE2009/051290

(51) Int. Cl.
*B60N 2/04*   (2006.01)
*F16M 11/20*   (2006.01)
(Continued)

(52) U.S. Cl.
CPC . *B60N 2/04* (2013.01); *A61G 5/04* (2013.01); *A61G 5/06* (2013.01); *A61G 5/061* (2013.01);
(Continued)

(58) Field of Classification Search
CPC .... B62D 55/075; B62D 37/00; A61G 5/061; A61G 5/1075; A61G 5/107; A61G 5/04; A61G 5/06; A61G 5/1056; A61G 2203/42; B60N 2/39; B60N 2/10; B60N 2002/0268; B60N 2/0232; B60N 2/0244; B60N 2/04; B60N 2/062; B60N 2/0745; Y10S 180/907; Y10S 280/10; B64D 2011/0092; B64D 2011/0606; B64D 11/064

See application file for complete search history.

(56) References Cited

U.S. PATENT DOCUMENTS 3,857,533 A   12/1974   Mason
4,647,053 A   3/1987   Kanno
(Continued)

FOREIGN PATENT DOCUMENTS

DE   19821451 A1   11/1998
GB   1432614 A   4/1976
JP   4306181 A   10/1992

*Primary Examiner* — Khoi Tran
*Assistant Examiner* — Robert Nguyen
(74) *Attorney, Agent, or Firm* — Larson & Larson, P.A.; Frank Liebenow; Patrick Reid

(57) ABSTRACT

A transportation apparatus includes a payload receiving unit, a transportation body, and a compensation system arranged there between providing adjustment of a desired spatial relationship of a payload surface of the compensation unit. The compensation system has at least one of a first compensation unit and a second compensation unit for adjustment of the spatial relationship. The compensation units adjust the spatial relationship in different directions. Thus the compensation system maintains a desired orientation of the payload surface independent of changes of orientation of the transportation surface. Further, the compensation system substantially maintains a common point of gravity of the transportation apparatus including the payload by displacing the center of gravity of the payload receiving unit and the payload substantially opposite to a displacement of a center of gravity of the transportation apparatus. At least one of the compensation units are extendable from at least one end thereof during operation.

17 Claims, 16 Drawing Sheets

(51) Int. Cl.
   *A61G 5/04*   (2013.01)
   *A61G 5/06*   (2006.01)
   *A61G 5/10*   (2006.01)
   *B60N 2/02*   (2006.01)
   *B60N 2/06*   (2006.01)
   *B60N 2/07*   (2006.01)
   *B60N 2/39*   (2006.01)
   *B64D 11/06*  (2006.01)
   *B64D 11/00*  (2006.01)

(52) U.S. Cl.
   CPC .............. *A61G 5/107* (2013.01); *A61G 5/1056* (2013.01); *A61G 5/1075* (2013.01); *B60N 2/0232* (2013.01); *B60N 2/0244* (2013.01); *B60N 2/062* (2013.01); *B60N 2/0745* (2013.01); *B60N 2/39* (2013.01); *B64D 11/064* (2014.12); *F16M 11/20* (2013.01); *A61G 2203/42* (2013.01); *B60N 2002/0268* (2013.01); *B64D 2011/0092* (2013.01)

(56) References Cited

U.S. PATENT DOCUMENTS

| | | |
|---|---|---|
| 5,207,408 A | 5/1993 | Burg |
| 5,641,030 A | 6/1997 | Toselli |
| 5,857,535 A | 1/1999 | Brooks |
| 6,026,920 A | 2/2000 | Obeda et al. |
| 6,273,389 B1 | 8/2001 | Carlgren |
| 6,325,167 B1 | 12/2001 | Jiang |
| 7,083,013 B2 | 8/2006 | Chuan |
| 8,371,403 B2 | 2/2013 | Underwood |
| 9,278,036 B2 * | 3/2016 | Lee ................ A61G 5/061 |
| 2003/0183428 A1 * | 10/2003 | Hedeen ............ A61G 5/061 |
| | | 180/9.32 |
| 2014/0202777 A1 * | 7/2014 | Lee ................. A61G 5/066 |
| | | 180/9.32 |

\* cited by examiner

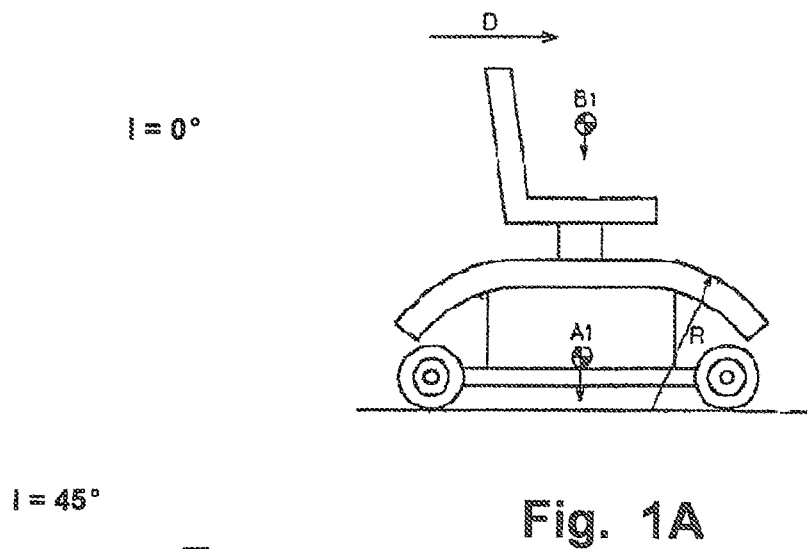
Fig. 1A
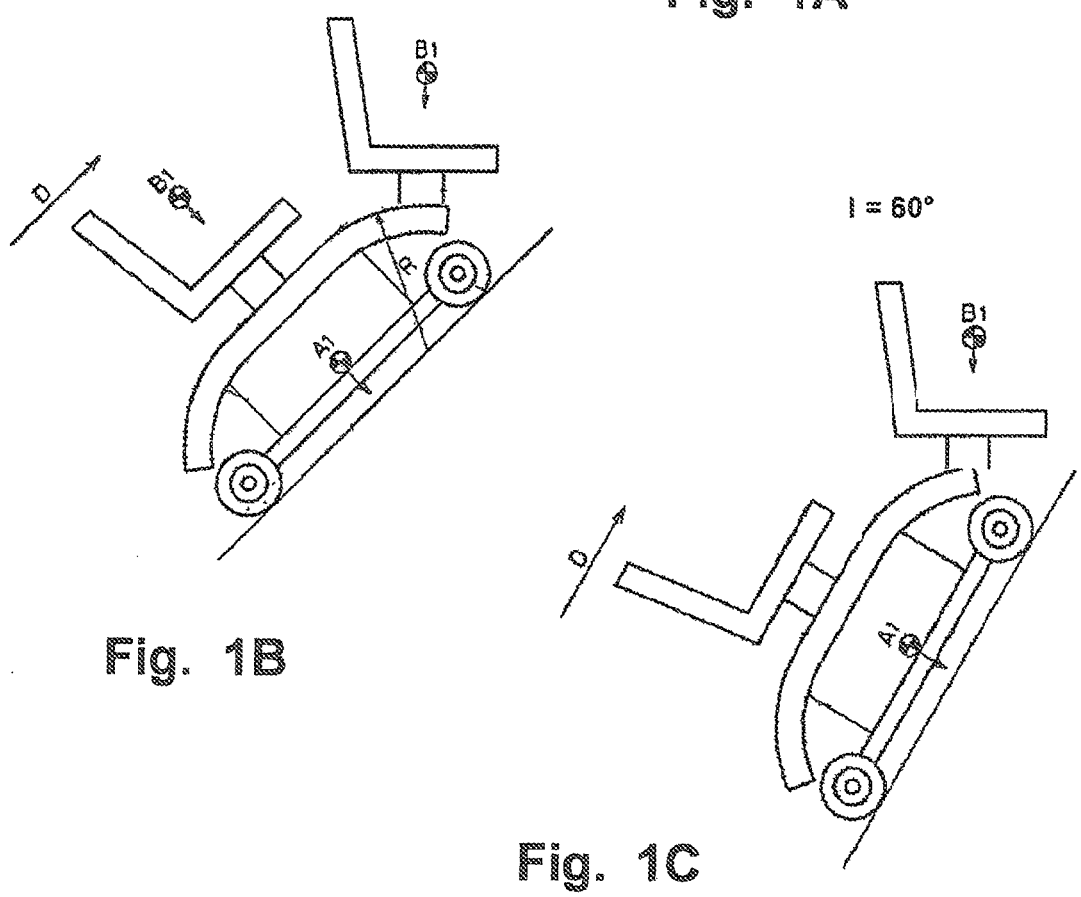
Fig. 1B
Fig. 1C

TRANSPORTATION APPARATUS AND METHOD FOR CARRYING A PAYLOAD IN A DESIRED PLANE INDEPENDENT OF 3D TILTING OF SAID APPARATUS

CROSS-REFERENCE TO RELATED APPLICATION

This application is a continuation-in-part of Ser. No. 13/106,291 filed May 12, 2011, which in turn is a non-provisional application and is a continuation-in-part of PCT application PCT/SE2009/051290, filed Nov. 12, 2009, which takes priority from Sweden patent application serial number 0850075-3, filed Nov. 12, 2008.

FIELD

The present invention pertains in general to the field of transportation apparatuses, like vehicles. More particularly the invention relates to transportation apparatuses having a payload supporting plane and a unit for maintaining a desired plane, such as a horizontal plane, of the payload supporting plane in a variety of topographies traversed by the transportation apparatus, as well as methods and computer programs related thereto.

BACKGROUND

Many transportation apparatuses are known. Efforts have been made to keep seats of such apparatuses in a horizontal plane in a single direction when travelling with the apparatus. However, the known apparatuses have a number of drawbacks.

For instance, in US2006061179 a vehicle is disclosed that has a chassis and a driver's seat which is fastened thereto. The seat can be set in its inclination with respect to the chassis and with respect to the longitudinal direction of the vehicle. An inclination sensor determines the angular position of the seat surface of the driver's seat with respect to the horizontal plane. An adjusting device is connected to the chassis and to the driver's seat, and a control and regulating device is operatively connected to the inclination sensor and the adjusting device. The driver's seat can be pivoted around a centre by means of the adjusting device in such a manner that its seat surface is situated essentially parallel to the horizontal plane. The pivot center coincides substantially with the mass center of the passenger in the seat. Thus the passenger is pivoted around its mass center, which is energy efficient.

However, the operating range of the vehicle disclosed in US2006061179 is thus rather limited. The compensation of the vehicle disclosed in US2006061179 is focused on downhill forward-aft compensation, e.g. when travelling along a road. Furthermore, as the mass center of the passenger is only pivoted, a common point of balance of the vehicle and the passenger is shifted. Thus, the vehicle may easily roll over when operated beyond the rather limited operating range, which is defined by the common point of balance shifting beyond the wheelbase of the vehicle. Moreover, lateral inclinations of the vehicle are not foreseen to be compensated. This further limits the operating range of the vehicle to travel substantially horizontal planes, like roads. In addition, lateral tilting is experienced as uncomfortable by the passenger and leads to lateral roll over of the vehicle at low lateral inclinations of the topography of approximately 5 degrees from the horizontal.

In DE19821451A1 an adjustment device is disclosed in form of a rail fixed to a vehicle's chassis. The rail has a straight first part extending horizontally in relation to the chassis on its horizontal surface. The second part of the rail is curved and attached to one end of the first part. A seat holder moves along the rail in reaction to a detected sloping position of the vehicle chassis in relation to the horizontal surface. The seat fixed to the holder is constantly aligned in reaction to the vehicle chassis travelling along the horizontal and sloping surfaces. A third, curved part of the rail is attached to the second end of the first part. The second and third parts are positioned at opposite ends of the first part. Thereby a common point of balance of the vehicle and the passenger are kept low and a compensation is made by moving the seat towards the end portions when a horizontally inclined or declined plane is traversed uphill or downhill, respectively.

However, as shown in FIG. 1, the operating range of the vehicle disclosed in DE19821451A1 is limited. For instance, the range of an angle of inclination I of the horizontally inclined plane traversed by the vehicle, is very limited, as the legs of the passenger will touch the surface of the inclined plane and prevent a continued movement of the vehicle, already at low inclination angles.

Moreover, a large translatory movement of the seat leads to long adjustment times. A considerable amount of time and energy is needed for this additional translatory movement. This translatory delay might also be perceived as discomfortable by the passenger. Especially when starting to travel downhill, the passenger will move from the seat's backrest due to the influence of gravity and the passenger will tip forwardly. The passenger will have to seek support, which is not possible for disabled passengers. Passengers restrained to the seat will also experience this forward acting force as discomfortably.

When travelling over terrain with many changes of inclination, a regulation may not be possible due to this translatory delay.

Also, lateral tilting leads to the same negative effects as described above with reference to US2006061179. The seat configuration disclosed in GB1432614 passively responds to inclination by which the supporting vehicle is affected. Thus, the mass moment of inertia of the seat configuration yields a time delay of the response, making the travelling over terrain unpleasant.

The vehicle disclosed in JP04306181, has drawbacks regarding capability in traveling over terrain with many changes of inclination, not only between the front and back wheel, also between the left and right hand-side of the vehicle. The wheelchair disclosed in U.S. Pat. No. 6,325,167 has similar drawbacks regarding oblique inclination in respect to chosen travel direction. Furthermore, the disclosed construction has similar operational drawbacks as discussed above regarding DE19821451A1. The dynamic seat leveling device in U.S. Pat. No. 6,026,920 compensates for inclinations when the vehicle is tilting. However the center of gravity of the vehicle and the seated person do not align in the longitudinal direction of the vehicle raise question regarding the efficiency and accuracy of the control of leveling when the vehicle is travelling on a hill. Moreover, the regulation instrument disclosed in U.S. Pat. No. 6,026,920 yields a digital leveling control as the instrument detects whether the inclination is above a certain predefined angle or not and adjusts accordingly, i.e. no gradual adjustment of the seat leveling is provided.

The leveling disclosed in U.S. Pat. No. 4,647,053 is capable to adjust lateral inclination changes by winding a wire attached to the respectively left and right hand-side proportion of the body of vehicle. A similar controlling instrument is used in U.S. Pat. No. 4,647,053, as above in U.S. Pat. No. 6,026,920, thus the disclosed leveling behavior is similarly disadvantageous.

Another adjustment system for leveling is disclosed in U.S. Pat. No. 3,857,533 using a mechanical arrangement with fingers and a curved rack. However, if absolute leveling is required the fingers and matching notches in the rack must be small, which makes the construction less strong to withstand a heavy payload.

A stabilizing system is disclosed in U.S. Pat. No. 5,207, 408 using a pressurized gas cushion. However, the system requires a first and a second structure for keeping the stabilizing effect working. The second structure is positioned within a hollow part of the first structure using shock absorbers and/or actuators. The disclosed construction restrains e.g. a payload plane as the first structure circumference making the vehicle less appropriate for e.g. loading bulky cargo. Another situation could be that a payload plane is elevated above the first structure to accommodate a large enough plane, however this will make the vehicle more instable as the center of gravity is shifted upwards.

Furthermore, another issue is that known vehicles, such as disclosed in DE19821451A1 have an as large wheelbase (distance between wheel axles) as possible, and an as low center of gravity of the payload as possible. However, this implies that the payload is oriented very low, which might be disadvantageous in certain situations. For instance, when a passenger is seated in such a vehicle, the low arrangement of the seat in relation to ground may be disadvantageous. An example is a use in terrain where an overview over the path to be travelled is important to get. Therefore, a more elevated arrangement of the payload carrying surface would be desired as is possible with conventional vehicles, with preserved or improved stability and tilting security. Also, a higher seat position would allow for eye contact of a seated person with standing persons. This is a social issue, and there is a need to provide this capability without impairing versatility of the vehicle with regard to virtual independence of transportation topography.

A further issue with prior art vehicles is high weight, in order to provide stability of the vehicle, in particular with a payload of large weight.

This limits the practical use of such vehicles, e.g. when wanting to travel in an elevator which has limited surface and load capacity available.

Lighter vehicles also need less propelling energy, which is a desired advantage.

Hence, there is a need for an improved transportation apparatus of less weight and/or footprint area, while allowing safe travel along a wide range of inclinations.

In addition, a combined active left-right and simultaneous active forward-aft compensation keeping a horizontal plane of a payload surface is desired.

Moreover, maintaining arbitrary planes of a payload surface of a transportation apparatus, other than a horizontal plane, may be desired.

Thus, there is a need for an improved transportation apparatus or compensation device and method for a payload therefore.

Hence, an improved transportation apparatus or compensation device, system or method therefore would be advantageous and in particular allowing for increased flexibility, range of operation, cost-effectiveness, and/or safety would be advantageous.

SUMMARY

Accordingly, embodiments preferably seek to mitigate, alleviate or eliminate one or more deficiencies, disadvantages or issues in the art, such as the above-identified, singly or in any combination by providing a transportation apparatus, a method, and a computer program according to the appended patent claims.

According to a first aspect of the invention, a transportation apparatus is provided. The transportation apparatus comprises a payload receiving unit, a transportation body, and a compensation system arranged there between. The compensation system is devised to allow adjustment of a desired spatial relationship between a payload surface of the compensation unit for attachment of the payload receiving unit and a transportation surface of the transportation body. Further, the compensation system comprises at least one of a first compensation unit or a second compensation unit arranged for adjustment of the spatial relationship. The first compensation unit is arranged for adjustment of the spatial relationship in a first direction and the second compensation unit is arranged for adjustment of the spatial relationship in a second direction different from the first direction, whereby the compensation system is adapted to maintain a desired orientation of the payload surface independent of changes of orientation of the transportation surface when the transportation apparatus is in motion. Further, the compensation system is adapted to substantially maintain a common point of gravity of the transportation apparatus including a payload by displacing a center of gravity of the payload receiving unit and the payload substantially opposite to a displacement of a center of gravity of the transportation apparatus. The first and/or second compensation units are extendable or expandable from at least one end thereof during operation. The first and/or second compensation units comprise at least one curved rail each having a curvature, in some embodiments.

According to another aspect of the invention, a method is provided. The method is method of substantially sustaining an orientation of payload surface of a payload receiving unit of transportation apparatus, independent of changes of orientation of a transportation surface of a transportation body of the transportation apparatus in motion. The method comprises real-time adjustment of a desired spatial relationship between the payload surface and the transportation surface by means of the compensation unit attached to the payload receiving unit and the transportation body, wherein the real-time adjustment comprises adjustment of the spatial relationship with at least one of a first compensation unit or a second compensation unit of the compensation system, and adjustment of the spatial relationship in a first direction by the first compensation unit, and adjustment of the spatial relationship in a second direction different from the first direction by the second compensation unit. Furthermore, a common point of gravity of the transportation apparatus including a payload is maintained by displacing a center of gravity of the payload receiving unit and the payload with the compensation system substantially opposite to a displacement of a center of gravity of the transportation apparatus. The first and/or second compensation units are extendable or expandable from at least one end thereof during operation, and the method includes expanding said first and/or second compensation unit during operation.

According to yet another aspect of the invention, a computer program is provided. The computer program is adapted for processing by a computer and storable on a computer-readable medium for substantially sustaining an orientation of payload surface of a payload receiving unit of transportation apparatus, independent of changes of orientation of a transportation surface of a transportation body of the transportation apparatus in motion. The computer program comprises a code segment for real-time adjustment of a desired spatial relationship between the payload surface and the transportation surface by means of the compensation unit attached to the payload receiving unit and the transportation body, wherein the real-time adjustment comprises adjustment of the spatial relationship with at least one of a first compensation unit or a second compensation unit of the compensation system, and adjustment of the spatial relationship in a first direction by the first compensation unit, and adjustment of the spatial relationship in a second direction different from the first direction by the second compensation unit. A further code segment is provided to substantially maintain a common point of gravity of the transportation apparatus including a payload by displacing a center of gravity of the payload receiving unit and the payload with the compensation system substantially opposite to a displacement of a center of gravity of the transportation apparatus, wherein the first and/or second compensation units are extendable or expandable from at least one end thereof during operation.

According to another aspect, a compensation unit is provided that comprises at least one unit that is extendable from at least one end thereof during operation. Several compensation units may be arranged suitably together. One or more of these compensation units may be arranged in an apparatus of the first aspect. The first and/or second compensation units may comprise at least one curved rail each having a curvature, in some embodiments. The extendable capability may be provided by telescopic systems.

Further embodiments of the invention are defined in the dependent claims, wherein features for the second and subsequent aspects of the invention are as for the first aspect mutatis mutandis.

Some embodiments of the invention provide for improved safety when transporting goods in an uneven environment, such as rough or at least partly not flat terrain.

Some embodiments of the invention also provide for a real-time maintenance of a transportation plane of a transportation apparatus in a desired plane, independent of the path of the transportation apparatus and a topography of the path.

Some embodiments of the invention provide for low energy consumption. A relatively low weight of the compensation system and/or vehicle contributes to this fact. Inertia of the payload in relation to the transportation unit is used during transition to increasing or decreasing inclinations, which also saves energy.

Some embodiments provide for vibration free personal transport of a passenger, which is in particular advantageous when transporting persons suffering from spasticity which is triggered by vibrations, inclinations, or both.

Some embodiments provide for an advantageous transportation of persons that suffer from muscle weakness or other myopathic diseases, who otherwise would fall off the transportation apparatus as they cannot compensate for inclinations thereof.

Some embodiments provide for a secure controlled center of gravity of the transportation apparatus including payload, and/or a secure displacement of such center of gravity. Thus tilting of the transportation apparatus is prevented.

Some embodiments provide for comfortable transport of a passenger, thanks to vibration free transportation independent of topography of an underground traveled over.

Some embodiments provide for a short wheelbase of the vehicle. In this manner a high degree of maneuverability is provided with a compact footprint that brings about enhanced versatility of use of a vehicle. As a center of gravity shifting is compensated, stability of the vehicle is maintained or improved.

Some embodiments provide for an elevated arrangement of a payload surface with maintained or improved stability of the vehicle. Thus, for instance a passenger in a seat on the payload surface is offered several advantages, such as an improved overview over the terrain to be traveled along.

Some embodiments provide for an improved social position of a transported passenger, as e.g. eye contact of the seated person is allowed at an elevated position with standing persons.

Some embodiments provide for improved versatility of the vehicle with regard to virtual independence of transportation topography.

Some of these advantages are achieved as the center of gravity is provided in a controlled manner. A payload center of gravity is moved opposite a displacement of the transportation body of the vehicle. Thus, a common center of gravity is maintained within a desired range, maintaining stability of the vehicle plus payload virtually independent of transportation topography. The common center of gravity is e.g. maintained within a wheelbase, close to the center thereof, even with a short wheelbase. A short wheel base is defined when the wheels are close to each other, e.g. within a wheel radius of each other.

Vibration in the context of this application are abrupt, sudden movements, rapid angular changes, e.g. when crossing a curb with a wheel based vehicle, or shaking due to undulations. Vibration in the context of this application does not encompass high frequent, transient displacements.

Transportation in the context of this application does, besides a movement of the transportation apparatus along a path of travel, even include standstill of the transportation apparatus in a location, e.g. when the underground is soft or non-rigid. For instance, the transportation apparatus is parked in a location with soft underground, and sinks slowly into the underground. Here, the compensation system is still active and maintains the desired plane, in particular when this slow sinking would lead to a change of the desired plane of the payload surface.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which embodiments of the invention are capable of will be apparent and elucidated from the following description, reference being made to the accompanying drawings, in which FIGS. 1A, 1B and 1C are schematic illustrations of a prior art vehicle;

DETAILED DESCRIPTION

Figure 2:
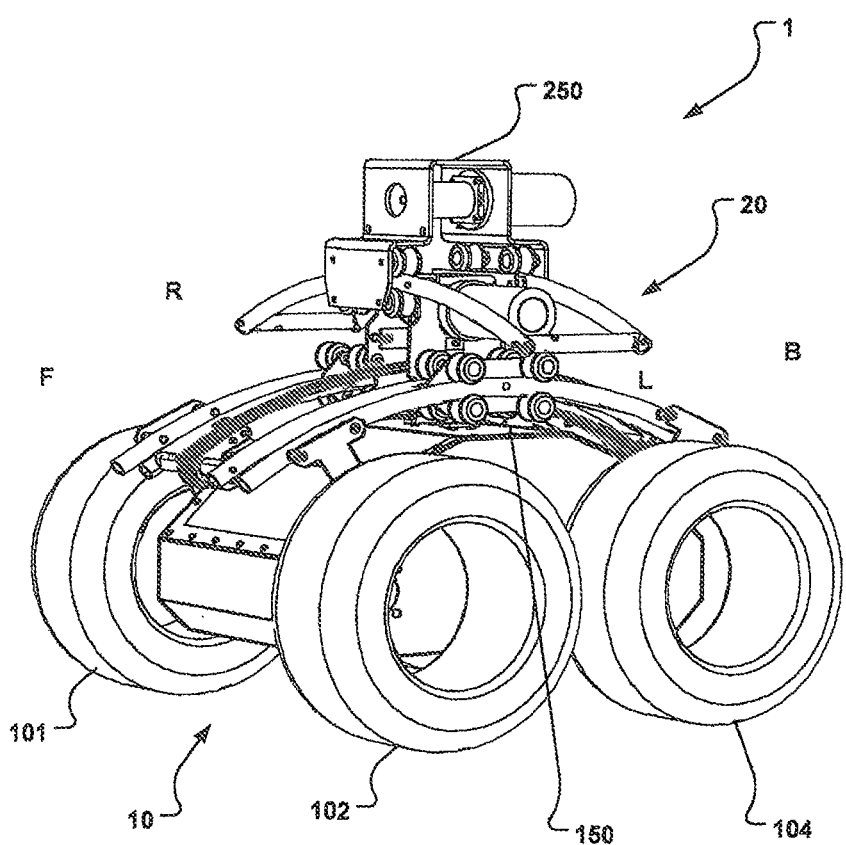
FIG. 2 is a perspective view of a transportation apparatus with a compensation system.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The following description focuses on embodiments applicable to an all terrain vehicle devised to carry a load, e.g. via a payload supporting plane. The all terrain vehicle may be a wheeled vehicle for travel along terrain. Studs or spikes in the wheel surface may enhance terrain grip.

However, it will be appreciated that the invention is not limited to this application but may be applied to many other transportation apparatuses, including for example snowmobiles, boats or airplanes.

In an embodiment, the transportation apparatus is an all terrain vehicle, below called vehicle; a load carrying platform, a first compensating unit arranged to compensate deviations of the load carrying platform from a desired plane in a first direction; and a second compensating unit arranged at an angle to the first compensating system, arranged to compensate deviations of the load carrying platform from the desired plane in a second direction.

The desired plane may be a horizontal plane, desired to keep in level. The desired plane may also be any another plane desired having a fixed relation to another plane, e.g. the horizontal plane. The desired plane is to be maintained when travelling along arbitrary topographies. Alternatively, or in addition, the desired plane may be changed and adjusted during operation of the vehicle. Adjustment may be made in dependence of a magnitude of one or more vehicle dynamics parameters, such as acceleration, deceleration, dive, roll, yaw. Adjustment may be made in dependence of a point or plane remote to the vehicle. Such adjustment may be made in order to allow reliable tracking of the vehicle.

Figure 3:
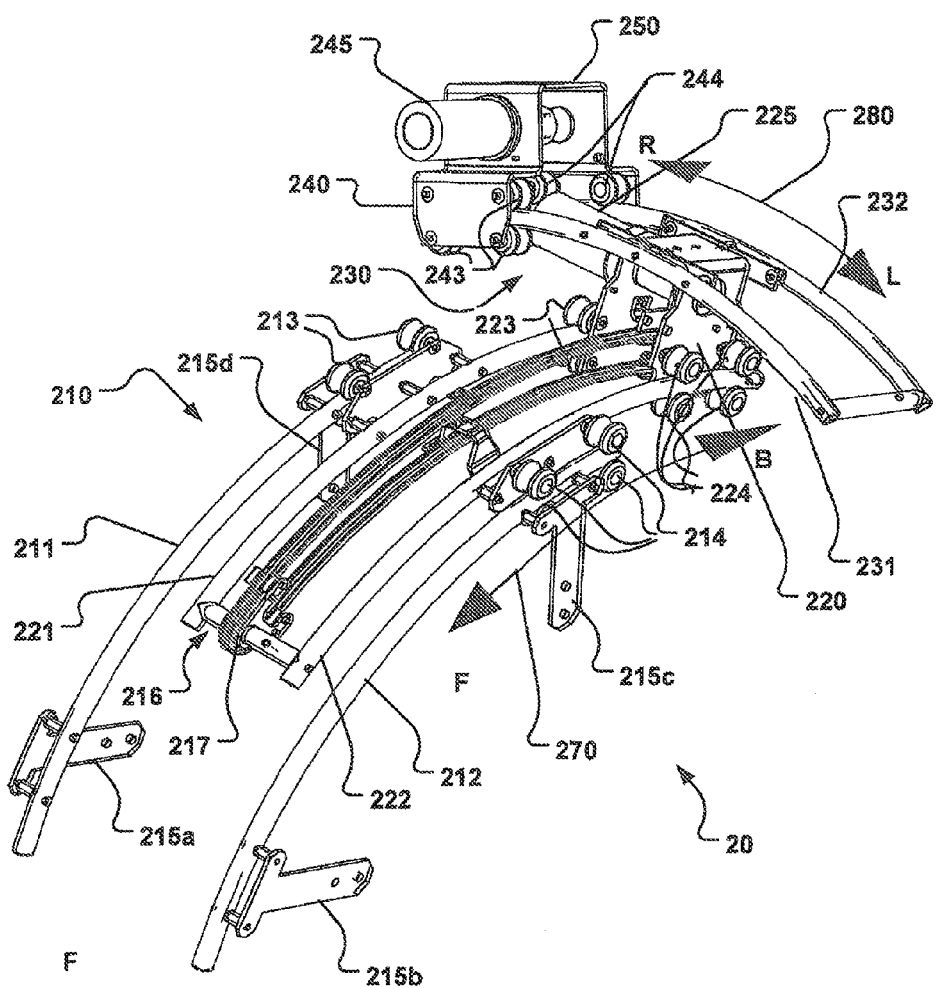
FIG. 3 is a perspective view of the compensation system of FIG. 2.
Figure 4:
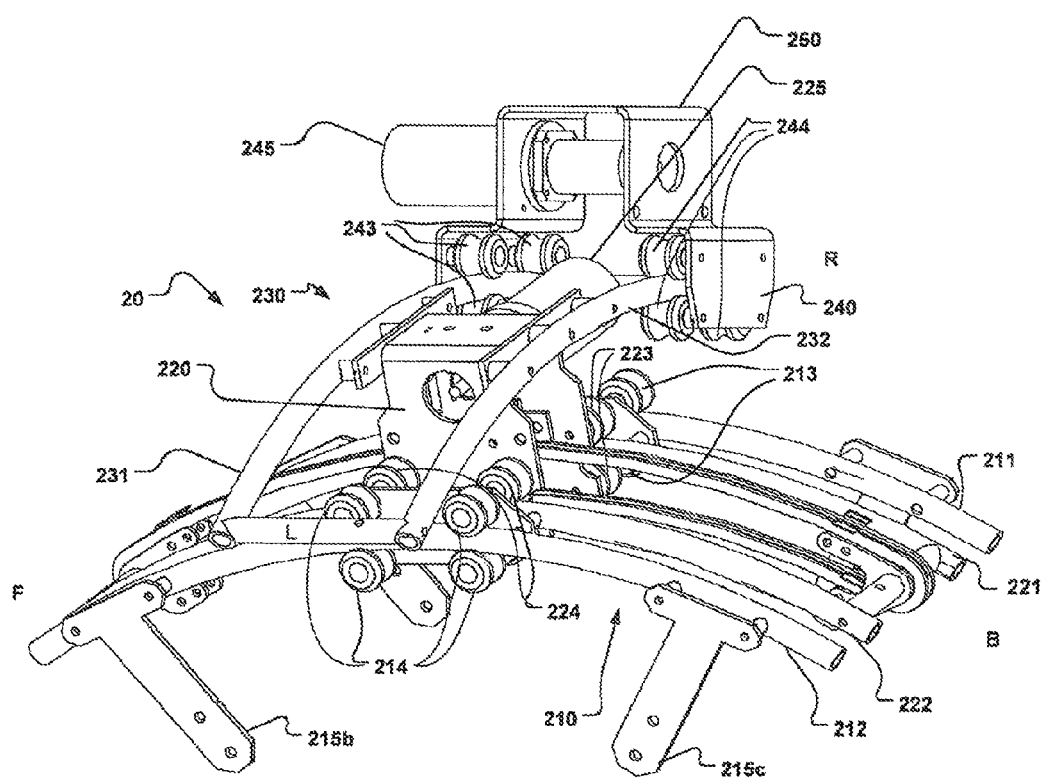
FIG. 4 is a different perspective view of the compensation system of FIG. 3.

Roll is a rotation around the longitudinal axis of the vehicle. Pure Roll is experienced by the vehicle when travelling horizontally along a slanted surface. Roll is illustrated in FIG. 3 by arrow 280 between the right side R and the left side L of the vehicle 1.

Dive is a rotation around the lateral axis of the vehicle. Pure Dive is experienced by the vehicle when travelling straight uphill or downhill perpendicular to the horizon, along a tilted surface. Dive is illustrated in FIG. 3 by arrow 270 between the front side F and the back side B of the vehicle 1.

Yaw is a rotation around the vertical axis of the vehicle. Pure Yaw is for instance experienced by the vehicle 1 when travelling horizontally and frictional engagement with the ground is at least partly lost.

Roll, Dive and Yaw may occur in arbitrary combinations, depending on parameters including the topography of the ground travelled, acceleration and deceleration of the vehicle, grip of the vehicle, etc.

The first compensating unit of the compensating system 20 is in an embodiment a forward-reverse compensating unit 210. The first direction is in this embodiment the forward-backward direction of the vehicle, and is thus arranged for compensating Dive motion of the vehicle 1.

The second compensating unit of the compensating system 20 is in the embodiment a left-right compensating unit 230, wherein the second direction is the left-right direction of the vehicle. The embodied second compensating unit 230 is thus arranged for compensating Roll motion of the vehicle 1.

Further compensating units may be suitably arranged in, e.g. for compensating a Yaw movement of the vehicle 1.

The first compensation unit 210 is affixed to a transportation body 10 of the vehicle 1 by means of one or more attachment units 215a-d. The second compensation unit 230 is in series movably affixed to the first compensation unit 210, as is described further below.

Transportation body 10 comprises a propellant unit. The propellant unit may comprise an electric motor, batteries, a gearbox, etc. Alternatively, or in addition, direct drive motors are integrated a hub of one or more wheels 101-104. Thus, the transportation body 10 may occupies less volume as shown in the figures. Ground clearance and terrain capabilities of the vehicle are thus further improved.

The transportation body 10 has ground contact by means of wheels 101-104. Wheels 101-104 are rotatable and propellable by the motorized propellant unit for driving engagement with the ground surface. The transportation body 10 may be sealingly enclosed in order to be water proof. Thus, the vehicle 1 may have an enhanced range of operation environment. For instance, the vehicle may be used in riverbeds, e.g. for a fly-fishing person transported by the vehicle 1, or for other underwater activities where the vehicle 1 can be partly or completely submerged.

The motorized unit of the transportation body 10 is driving one or more of the wheels 101-104 and causes locomotion of the assembly of transportation body 10, compensation system 20 and the payload receiving unit 30 as well as a payload over the surface. Vehicle dynamic control algorithms may be applied to stabilize the motion of the vehicle 1 over the surface of underground 80, e.g. stairs 800 or uneven terrain 810. The vehicle 1 may be user-guidable along the path of travel. Wheels 101-104 may respond to commands of the user. User commands may be actuated, for example by means of a user input interface device, such as a joystick. Thus the vehicle 1 may take the form of a motorized all terrain vehicle.

The wheels 101-104 help to define a series of axes of the vehicle including a lateral axis LR parallel to the axis coincident with the axles of wheels 101-104, a fore-rear FR longitudinal axis perpendicular to the wheel axis as well as a vertical axis perpendicular to both the lateral and longitudinal axis. Directions parallel to the axes FR and LR are called the fore-aft and lateral directions respectively.

The distance between the axles of wheels 102, 104 establishes the wheelbase of vehicle 1. The wheel base may range from one-half to two times the radius of a wheel 101-104. The sizes of the wheels 101-104 may be equal in size as shown, or may be unequal in size.

In addition, the transportation body 10 may comprises a boggy car solution, where a central pivot joint provides for foldable movement of the transportation body 10 resulting in a movement of front and rear wheels in relation to each other.

The forward-reverse (FR) compensating unit and the left-right (LR) compensating unit comprise in embodiments at least one curved rail with a defined radius respectively.

In embodiments, the curvature of the rails is arranged in relation to a common virtual centerpoint that is situated below the vehicle. The rail has no straight portion. The curvature is preferably circular. Thus, two rails arranged on different height from ground level will have different curvatures. The higher arranged rail has a larger curvature than the lower arranged rail, again in relation to ground level.

In more detail, the first compensation unit 210 has a right rail 211 and a left rail 212. Right rail 211 and a left rail 212 are affixed to the chassis of vehicle 1. The second compensation unit has a front rail 231 and a rear rail 232.

The forward-reverse (FR) compensating unit 210 and the left-right compensating unit 230 comprise wheels or rollers, below called wheels, that due to its shape, enable the units to run along rails with maintained side stability. Alternatively to the illustrated four roller solution, different number of rollers may be provided, such as two side rollers or a three roller configuration.

The forward-reverse compensating unit 210 is enabled to run along its rails for FR compensation. The left-right (LR) compensating unit is enabled to run along its rails for LR compensation.

In more detail, the FR compensating unit 210 comprises a set of right rail wheels 213 and a set of left rail wheels 214. The LR compensating unit comprises a set of front wheels 243 and a set of rear wheels 244.

The load carrying platform 250 is arranged on the left-right compensation unit 230, providing that the platform 250 is arranged to run along the rails 231, 232 of the left-right compensating unit 230, supported by the set of front wheels 243 and the set of rear wheels 244.

The forward-reverse compensating unit 210 and the left-right compensating unit 230 are arranged to operate in different directions. The two units of the embodiment cross each other's path at a 90 degrees angle, as illustrated in FIG. 3.

In other embodiments, the crossing angle between two compensation units of a compensation system may be any angle larger than 0 degrees up to less than 180 degrees.

In addition, or alternatively, the forward-reverse compensating unit 210 and the left-right compensating unit 230 may be placed at any angle in relation to the longitudinal axis of the vehicle. Thus, the forward-reverse compensating unit 210 and the left-right compensating unit 230 should not be interpreted as limited to these specific directions related to the specific directions of the vehicle.

In the illustrated embodiment, all the rails 211, 212, 231, 232 radii are provided such that the payload carrying platform's 250 horizontal reference plane remains parallel in reference to the horizontal plane at any position the platform may have at any time when compensating as described herein.

In other embodiments the rails may be shaped in one or several concave-like curved shapes, i.e. calculated radii and/or splines so there will be a controlled shifting of the common weight point when driving at large inclination angles. The radii are chosen such that the common weight point is still with the platform's horizontal reference plane while the load carrying platform 250 remains at the same at all positions in the desired relation to the reference, e.g. of the horizontal plane.

One shape of the rails is where the curvature thereof is chosen to be of a radius with its centre point placed at the average rotation point of the vehicle on the middle part of the rails. This allows the carrier to run over obstacles up to a certain degree with energy saving capabilities using the inertia of the moving parts.

Low energy consumption is provided during ride along such obstacles. Inertia of the payload in relation to the transportation unit is used during transition to increasing or decreasing inclinations. Obstacles of a certain degree will cause an at least partly passive movement. The movement is directed backwardly when changing to downhill from level and from uphill to level, as well as forwardly when changing from level to uphill and from downhill to level. Breaking or damping of these at least partly passive movements may be controlled actively for increased safety. The passive movement may be supported by an active movement of the drive units of the compensation unit support to adapt the desired plane quicker to conditions in real time.

The crossed tubes or rails may be mass customized manufactured, adapted to individual mass and distribution of a payload, e.g. a passenger in a seat 300.

In order to achieve a maintained centered weight point at great declination or inclination angles, the compensation of the payload weight on the platform, a geometry of very long rails is demanded. Such long rails collide with objects when running on a horizontal plane in the process of climbing obstacles. Therefore, expanding capabilities are provided to overcome this drawback in some embodiments. Telescopic rails are a solution to the issue. Hence, the operating range of the transportation apparatus is further improved.

In embodiments the range of operation is this extended by at least one expandable or extendable unit or system of the compensation unit.

In the Figures, the first compensation unit is shown with such extension or expansion capabilities provided in the form of extension rails. In more detail, the expansion unit comprises an extension unit 216 with a right extension rail 221 and a left extension rail 222. A set of right extension rail wheels 223 and a set of left extension rail wheels 224 facilitate a relative movement of the extension unit in relation to the first compensation unit 210 proportionally by a looping chain 217, attached at the top to 220 and at the bottom to transportation body 10. The second compensation unit 230 slides along the extension unit and thus along the first compensation unit by means of wheels 223, 224. Without the extension unit, wheels 223, 224 are arranged directly at the rails 211, 212 without the intermediate extension rails 221, 222 (not shown).

At least one of the compensating units may comprise an expandable rail system. For instance, the forward-reverse compensating unit may be an expandable unit in order to reach further out than a nonexpendable compensation system while the left-right compensating unit may be a nonexpendable system. In some embodiments, both the forward-reverse compensating unit 210 and the left-right compensating unit 230 may be expandable or non-expandable.

The expandable system applied to forward-reverse and/or left-right, consists of a rail or rails, and a wagon 220 with rail or rails and wheels that runs on the first of the rail or rails, to meet the geometrical demands of, at first, weight compensation by shifting the weight of the application mounted on the platform stretching far out in relation to the vehicle, and secondly, be able to drive close to obstacles so the wheels of the vehicle can reach and climb the obstacles.

The expandable system may be extendable or expandable from one or two ends of the compensation unit.

In an embodiment the vehicle is equipped with an 3D tracking device, such as an inclinometer, gyro, or similar sensor devices that in real time give information of all the angles a reference plane of the vehicle (i.e. in the embodiments shown in the Figs., the transportation surface 150) has at any given time in comparison to the horizontal plane. The device can also in real time provide information of any ongoing angular changes in detail i.e. any moving angle velocity speed, acceleration and deceleration of the vehicle. The transportation surface 150 may also be virtually defined. The transportation surface 150 is a reference surface to which the payload surface has a varying state, depending on the topography of the underground along which the vehicle travels.

The forward-reverse platform 220 and the left-right platform 250 are equipped with actuators and position sensors that enable a steering system to move and position the compensation units of the compensation system 20 in real time. This is provided in such a manner that the position of the load carrying platform 250 always compensates the common centre of gravity of the total system, i.e. the transportation body 10, compensation system 20, and payload receiving unit 30, as well as a payload on the latter. Thus rolling over of the vehicle is effectively prevented.

The common centre of gravity is kept within the wheelbase of the two axles of the vehicle. It is preferably centered between the wheelbase of the vehicle at any given time during movement and angular changes of the vehicle. Rolling over of the vehicle is thus efficiently avoided.

Figure 5:
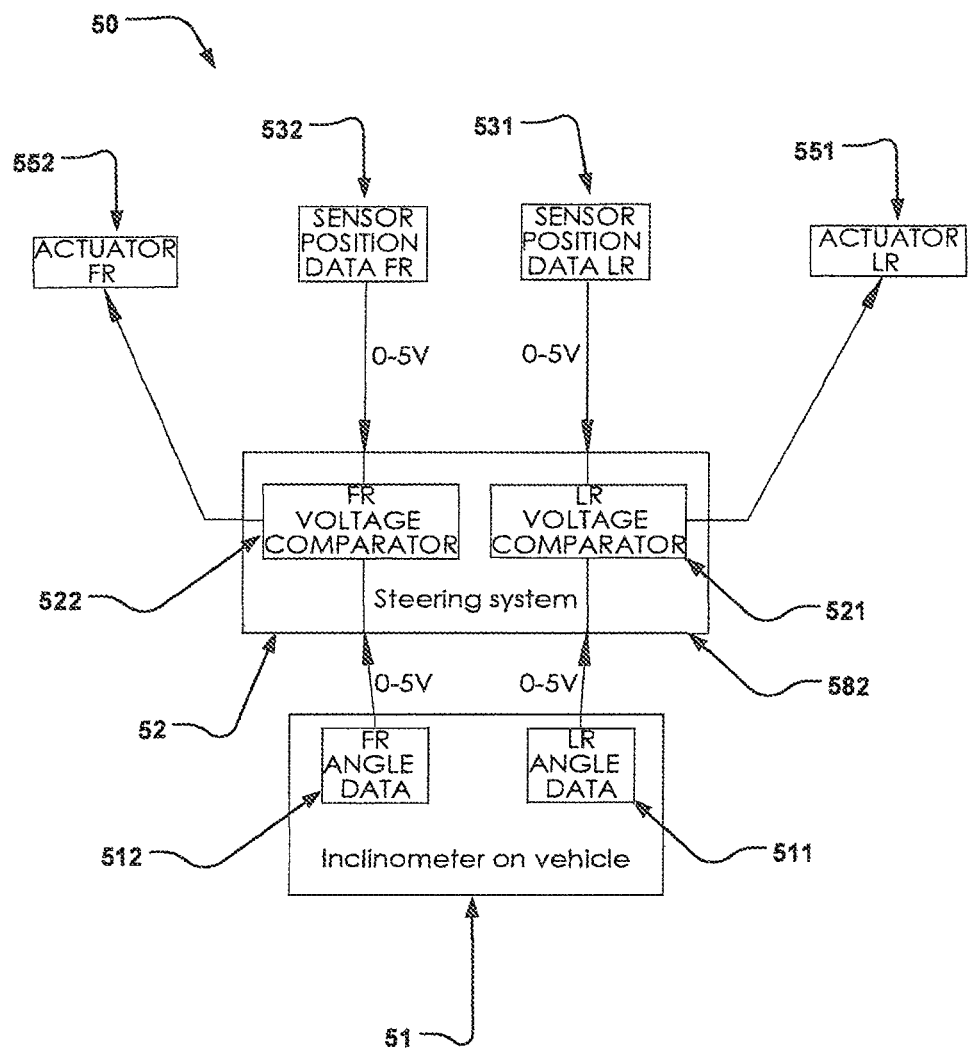
FIG. 5 is a block diagram that illustrates an interactive information flow 50 between sensor components and control system of a transportation apparatus 1 having a compensation system.
Figure 6:
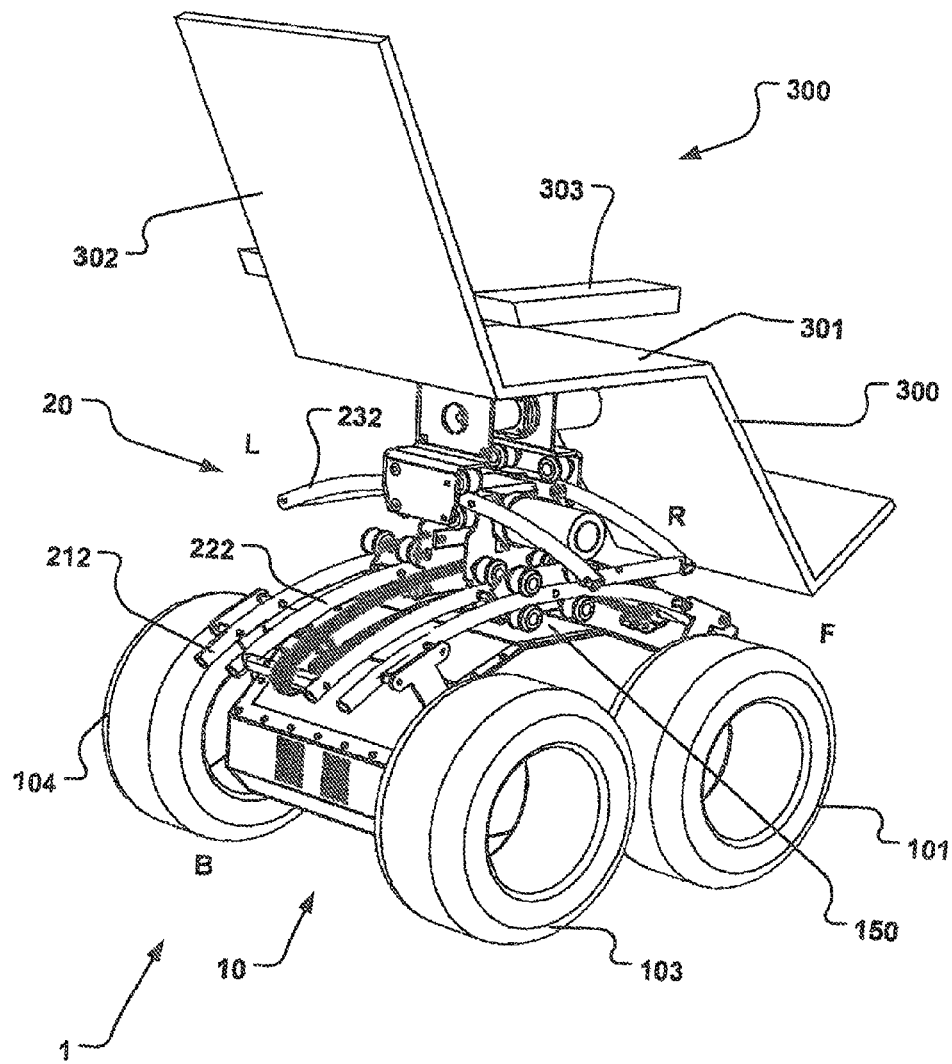
FIG. 6 is a perspective view laterally from behind of a transportation apparatus carrying a seat for a passenger in a configuration for passage along a horizontal topography.
Figure 7:
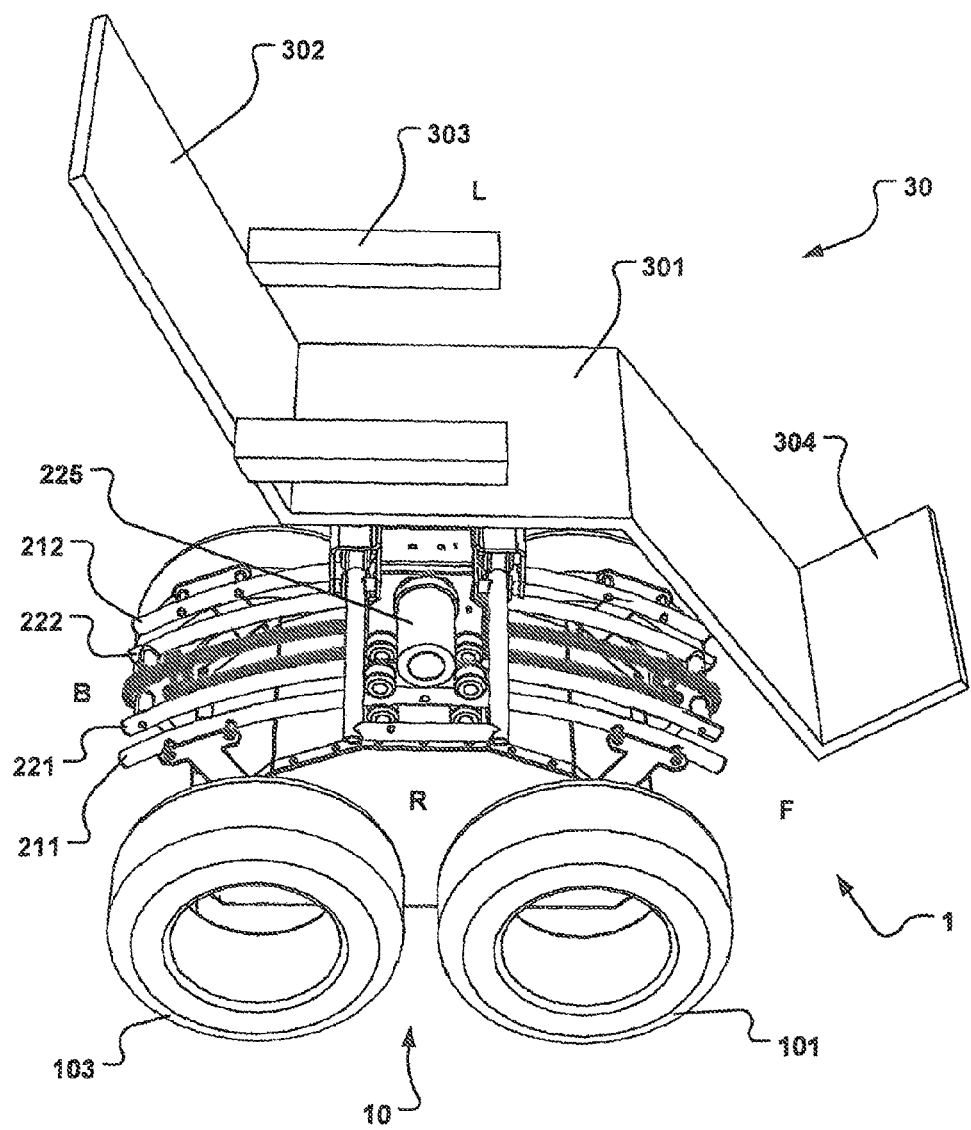
FIG. 7 is an elevated perspective view from the right side of the transportation apparatus of FIG. 6.

FIG. 5 is a block diagram that illustrates an interactive information flow 50 between these sensor components and a control system of a transportation apparatus having multiple compensation units, comprising Inclinometer units 51 on the vehicle 1 providing Forward-reverse angle data 512 and Left-right angle data 511; a steering system 52 comprising a Forward-reverse voltage comparator 522, and a Left-right voltage comparator 521; a Sensor position data forward-reverse 532; a Sensor position data left-right 531; an Actuator forward-reverse 552; and an Actuator left-right 551. The compensation systems may thus be controlled according to this information flow, e.g. by a suitable implementing software.

The sensors providing the sensor position data forward-reverse 532 or left-right 531 may be provided in the form of encoders on the forward-reverse actuator 552 and the left-right actuator 551. Alternatively, or in addition, one or more of these sensors providing data 531, 532 may be provided in the form of a distance sensor detecting the current deflection of the forward-reverse or left-right compensation unit from a defined zero crossing position, in which an equilibrium is present when the vehicle is oriented in a horizontal plane.

The signal of the inclinometer 51 to the steering system 52 may be suitably filtered to only represent signal portions representing vibration as defined above, acceleration, deceleration, and/or collision detection.

The comparators 521, 522 thus detect a deviation of the orientation in space of the reference plane 150 in relation to the payload carrying surface 250. The inclinometer 51 provides in real time information of all the angles of the reference plane 150, as well as information of any ongoing angular changes in detail i.e. any moving angle velocity speed, acceleration and deceleration of the vehicle 1. The forward-reverse platform 220 and the left-right platform 250 are equipped position sensors that provide sensor data 531, 532. Actuators 225, 245 enable a steering system to move and position the compensation units 210, 230 of the compensation system 20 in real time. A control feedback loop, e.g. a P or PI control algorithm based control, sees to that adjustment of desired geometrical relationships of the compensation system are achieved. In this manner the position of the load carrying platform 250 is effectively compensated with reference to the common centre of gravity of the total system, i.e. the transportation body 10, compensation system 20, and payload receiving unit 30, as well as a payload on the latter. Thus rolling over of the vehicle is effectively prevented, as mentioned above.

In order to achieve a controlled weight point shifting at large angles of decline or inclination, a proportional expansion of the compensation system is provided, i.e. a proportional movement between the forward-reverse and left-right compensation units.

That is achieved by making the forward-reverse travel in relation to the vehicle the same distance as making the left-right travel in relation to forward-reverse. This may be provided by means of left-right compensation unit and the vehicle connected to each other by a looping chain 217, belt or wire with no ends, that runs around the edges of the extension unit 216, with a point on the upper side connected to the forward reverse platform 220 and at a point at the opposite side connected to the transportation body 10, thus making the expansion proportional.

The forward-reverse movement is achieved by an actuator 225 placed in the frame of the wagon 220 of the left-right compensation unit 230. The actuator 225 is configured to drive a chain, belt or wire that is connected to the ends of the extension unit 216. The actuator may for instance actuate upon a chain in an Omega-drive (three gearwheels, whereof the middle one is driven by the actuator. Other arrangements of actuators may be provided, such as direct drive actuators.

The compensation system is configured such that when pulling the left-right compensation unit 230 along the extension unit 216, the two units 216, 230 will together travel proportionally in relation to the first compensation unit 210 by the looping chain, belt or wire 217, that runs around the edges of the extension unit and is fastened at the bottom to the transportation body 10 and at the top to the forward reverse platform 220.

The second compensation unit may also have a separate LR actuator 245 for providing the movement of the second compensation unit 230 in relation to the first compensation unit 210.

In an embodiment, the load carrying platform 250 of the vehicle may be equipped with a seat 300. The seat 300 comprises a seating surface 301, a backrest 302 and may comprise armrests 303 and/or footrests 304.

Thanks to the compensation systems, vibration free personal transport of a passenger may be provided in the seat 300. The passenger may be maintained in a desired position, including an upright position. Maintaining the desired position is provided substantially independent of the topography of the surface on which the vehicle 1 is positioned. Maintaining the desired position is in embodiments provided with optimal high comfort for the passenger.

The position of the passenger may also be adapted during travel to different parameters.

The vehicle 1 is in an operative drive mode propelled along ascending and descending paths of travel relative to an obstacle such as a stairway, hillside, rough terrain, or the like. During the ride, movements of the vehicle relative the paths of travel are compensated by the compensation system 20. Some examples are given below.

Figure 8:
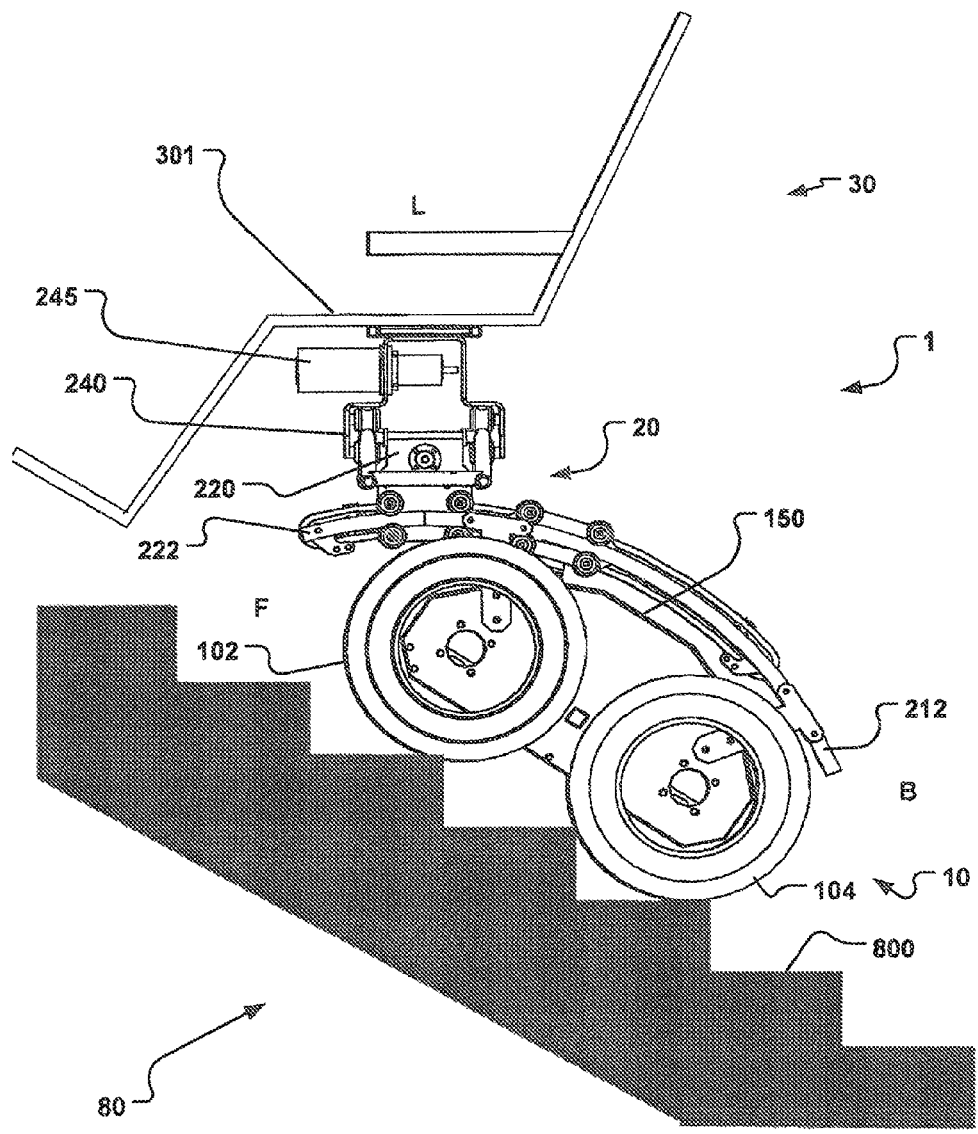
FIG. 8 is a side view from the left of the apparatus of FIG. 6 in a configuration for passage upwardly along a pair of stairs.

In FIG. 8 the vehicle 1 is shown travelling upwardly along a pair of stairs. The vehicle 1 transports in an embodiment a human in the seat 300. The human may be a disabled person that is supported in the seat 300. The human is kept safe in the seat 300 independent of the path of travel over ground. Even large angular changes in the path of travel, like over stairs are efficiently compensated.

Figure 9:
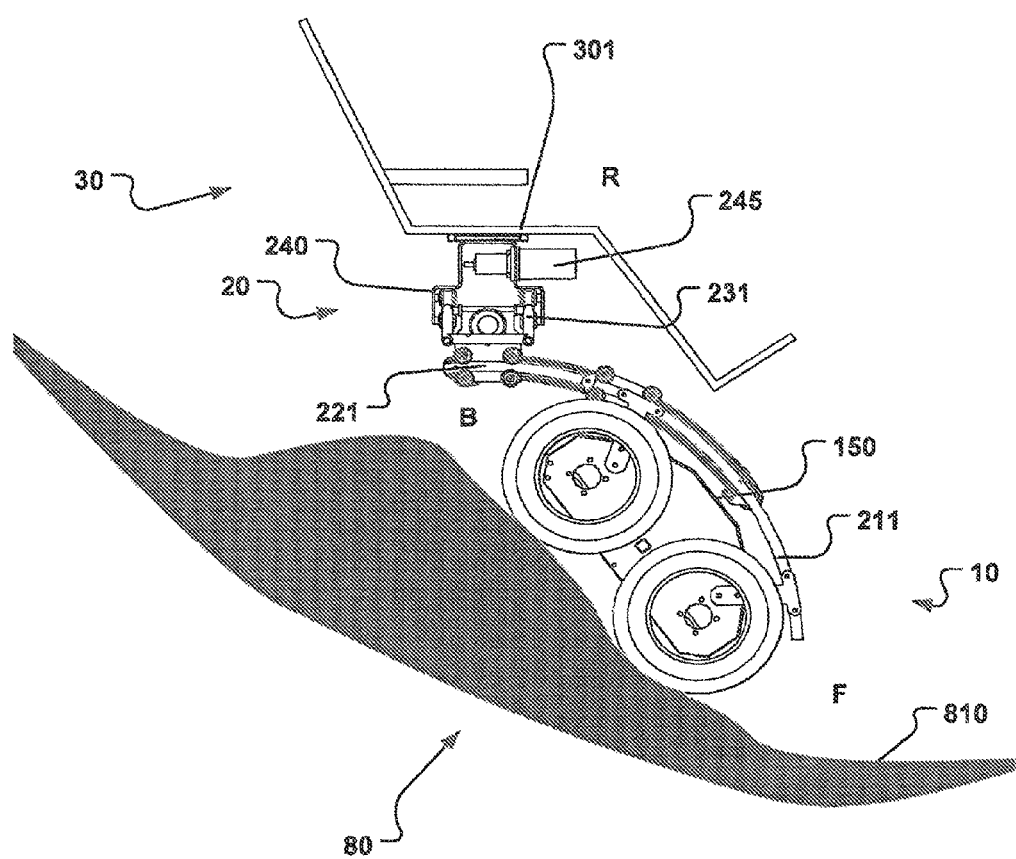
FIG. 9 is a side view from the right of the apparatus of FIG. 6 in a configuration for passage downhill along an uneven terrain.
Figure 10:
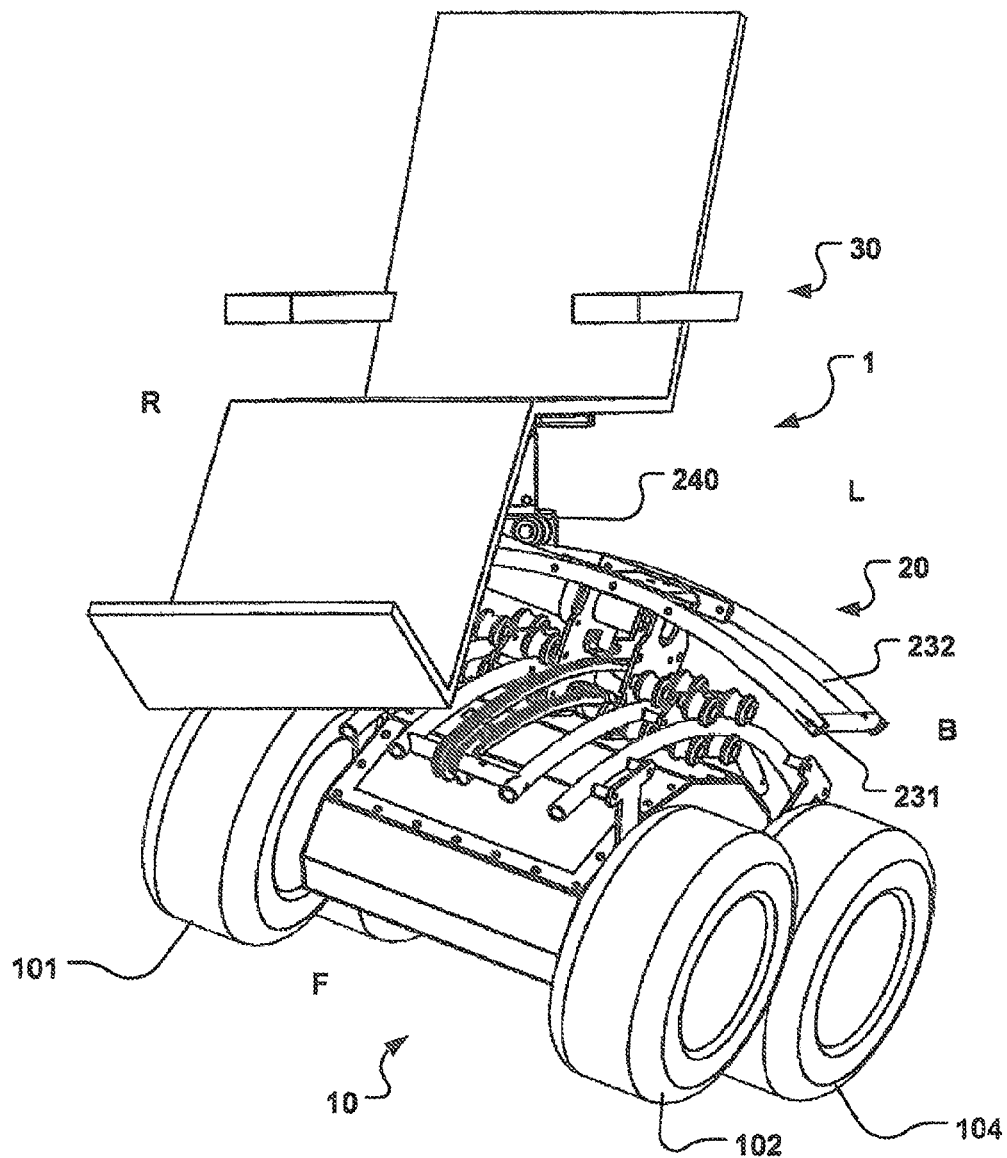
FIG. 10 is an elevated frontal perspective view of the transportation apparatus of FIG. 6 in a configuration for passage uphill along a tilted and slanted topography, e.g. diagonally upwards a pair of stairs.
Figure 11:
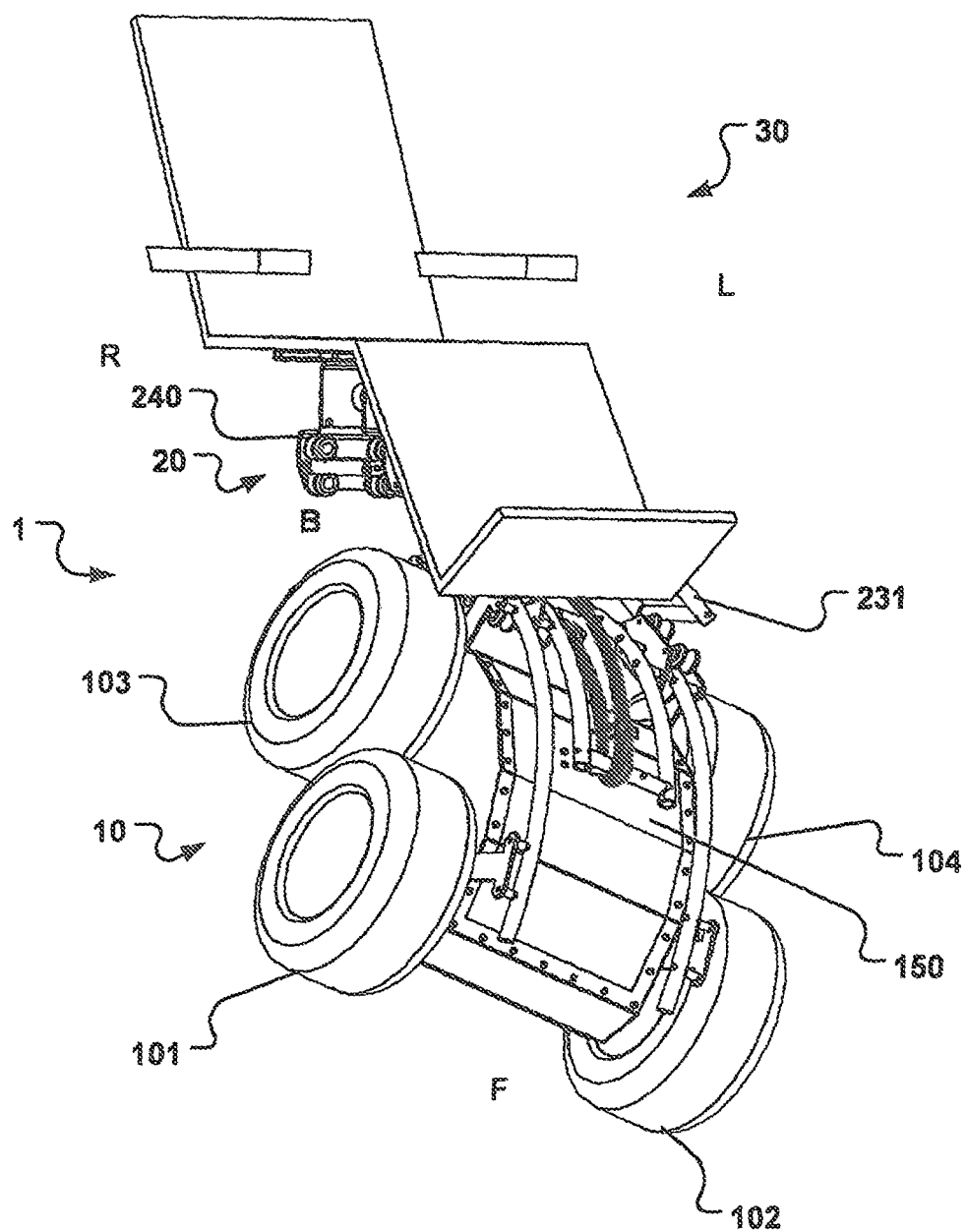
FIG. 11 is an elevated perspective view of the transportation apparatus of FIG. 6 in a configuration for passage downhill along a tilted and slanted topography, e.g. diagonally downwards a pair of stairs.
Figure 12:
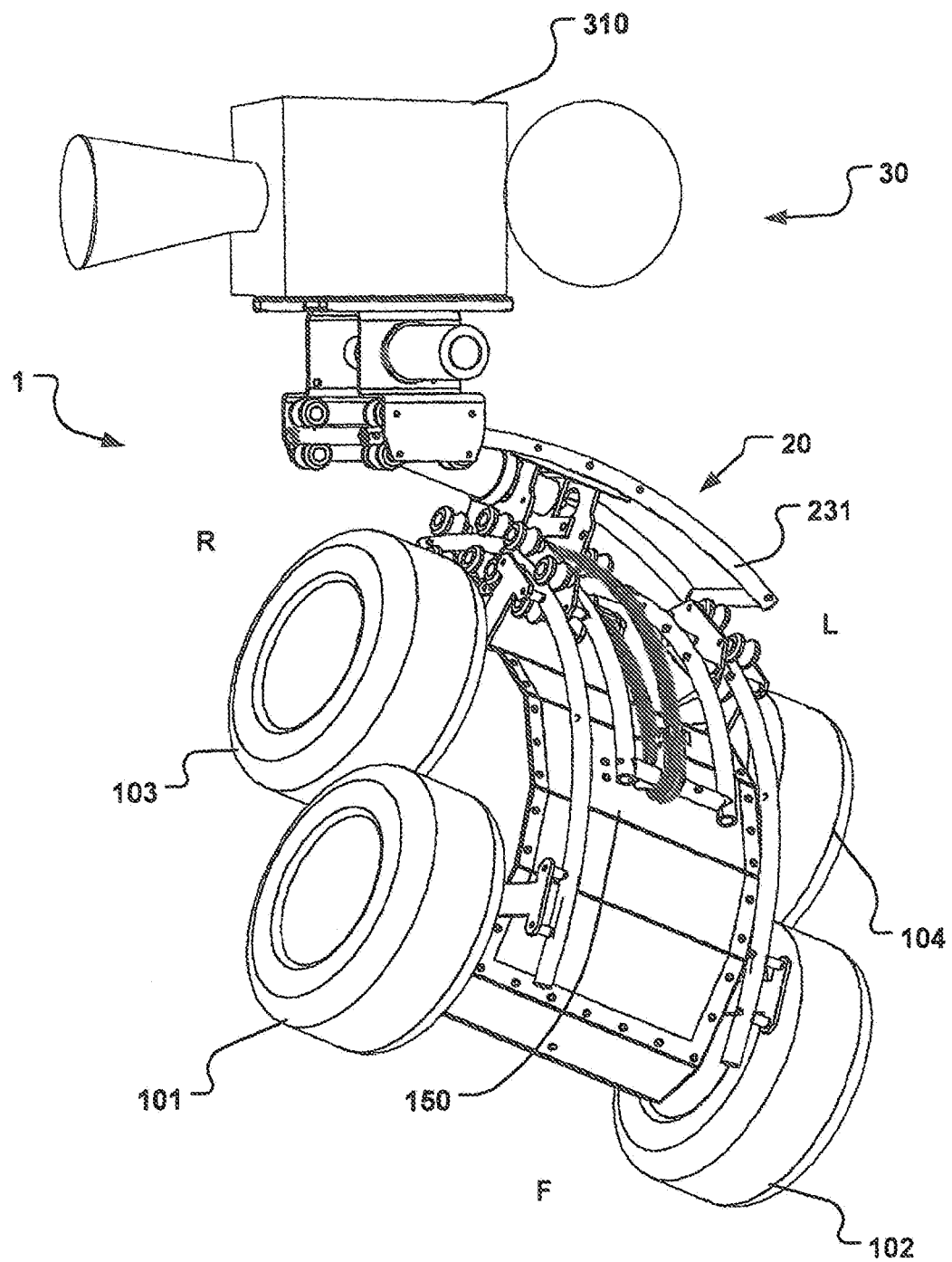
FIG. 12 is an elevated perspective view of a transportation apparatus carrying a payload in form of a camera in a configuration for passage downhill along a tilted and slanted topography.
Figure 13:
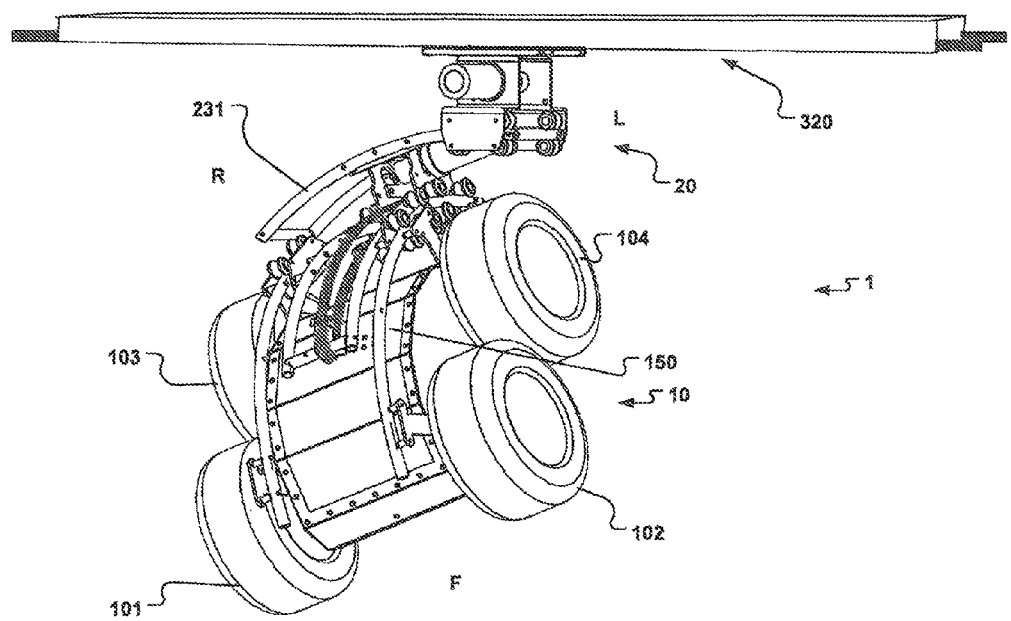
FIG. 13 is an elevated perspective view of a transportation apparatus carrying a payload in form of a stretcher in a configuration for passage downhill along a tilted and slanted topography.
Figure 14:
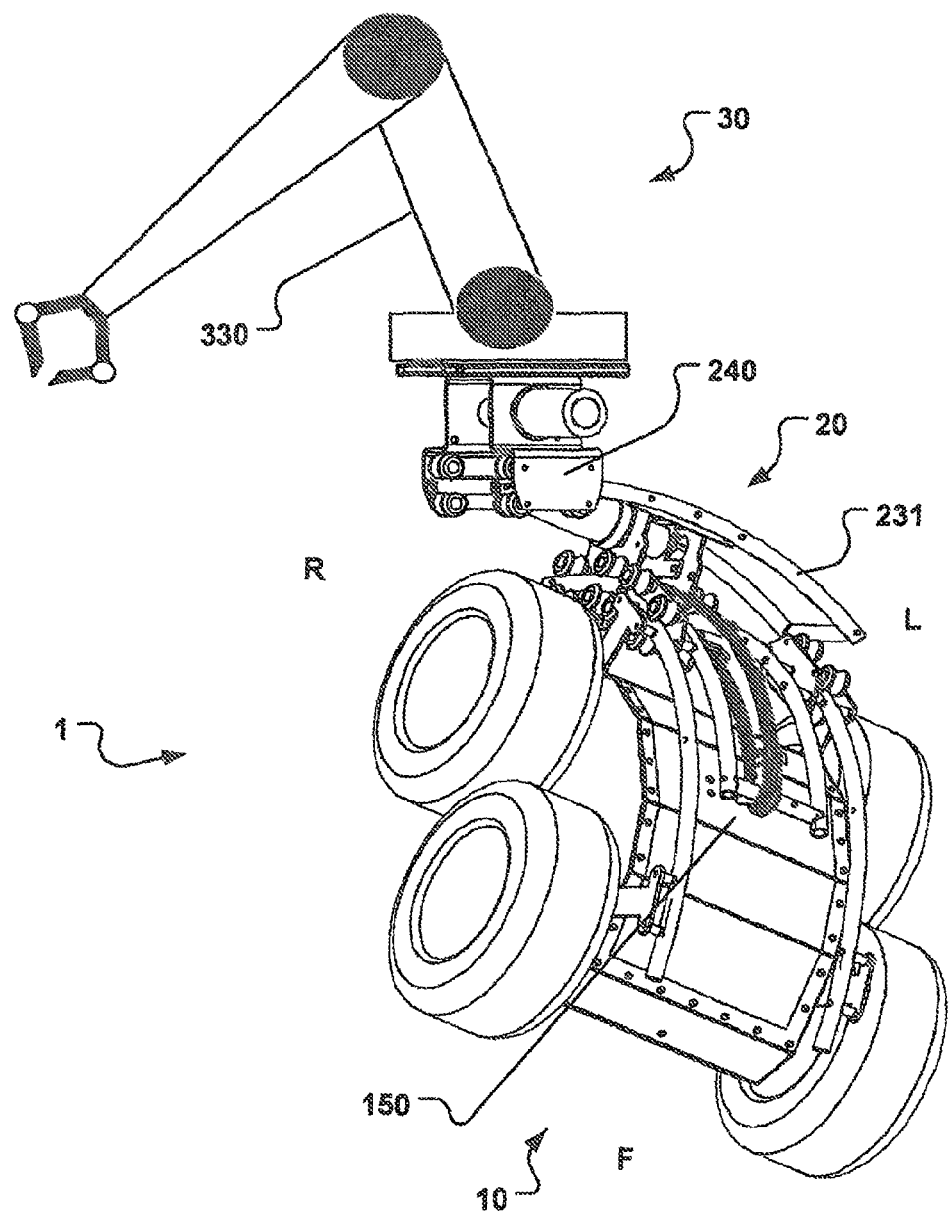
FIG. 14 is an elevated perspective view of a transportation apparatus carrying a payload in form of a robot arm in a configuration for passage downhill along a tilted and slanted topography.
Figure 15:
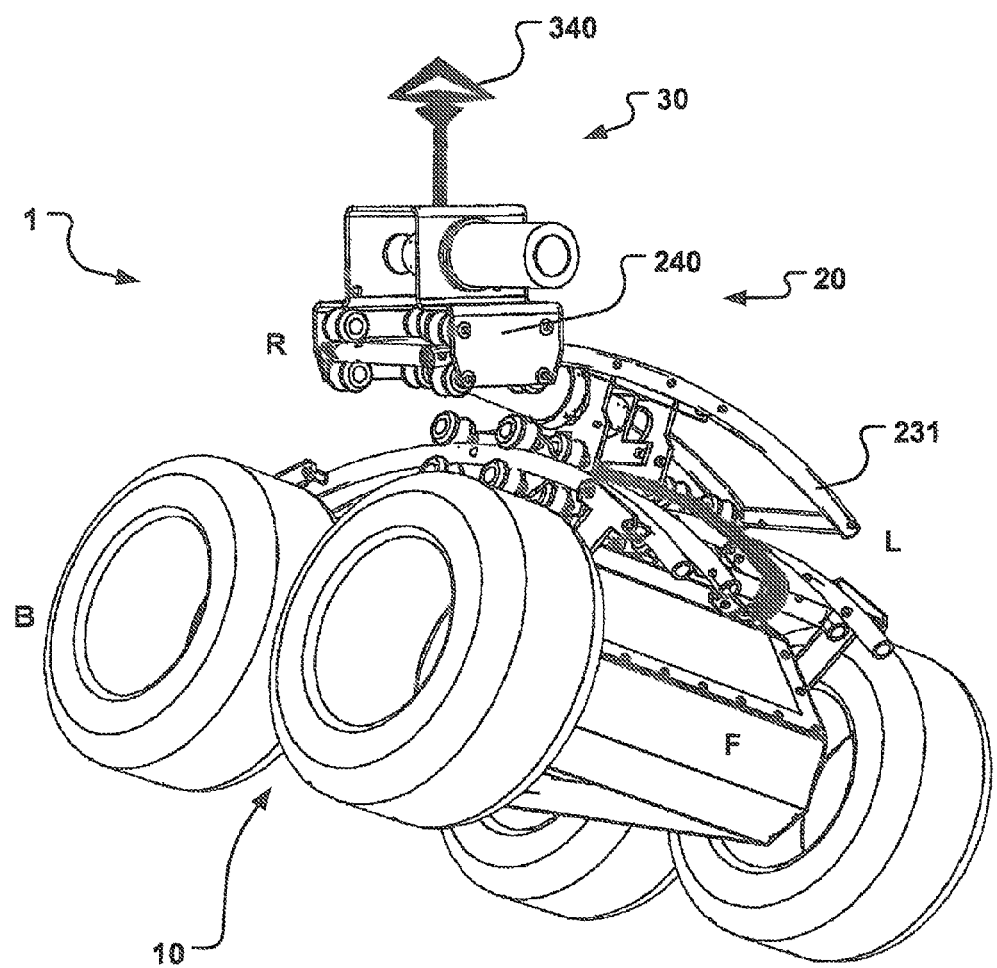
FIG. 15 is a frontal lateral perspective slightly from below of a transportation apparatus carrying a payload in form of a marking beacon in a configuration for passage along a slanted topography.

In FIG. 9 the vehicle is shown travelling downhill along an uneven terrain with a large tilting angle of approx. 60 degrees.

In addition, or alternatively to the forward rearward compensation shown in FIGS. 8 and 9, the second compensation unit provides for compensation in a second direction, here a left-right compensation. Thus a desired cargo plane is maintained independent of Roll or Dive of the vehicle along a path of travel. In this manner extreme maneuvers, such as travelling a staircase diagonally, or arbitrary movement in rough terrain may be performed by the vehicle 1 while maintaining the desired plane of the load carrying surface 250.

The transportation apparatus is in embodiments a versatile portable transporting apparatus which can interchangeably function as various payload carriers. The apparatus may be a medical rescue carrier for injured persons and be converted to a medical support platform, called stretcher. The apparatus may function as a game transporting apparatus, or as an equipment transporting apparatus. The interchangeability function may be implemented with interfitting parts and quick lock units. The apparatus is provided for facilitating transporting a payload over long, rough paths of travel, while a cargo level is kept independent thereof.

Hence, in an embodiment, the load carrying platform of the vehicle comprises a carrier on which interchangeable equipment can be mounted on the load carrying platform 250. The equipment may be one or more stretchers 320, robot arms 330, cameras 310 or any sensitive equipment 340 that needs a vibration free transport in a rugged terrain environment with a stabilized desired plane of the equipment on top of the platform. A stretcher is a device for transporting ill, wounded or dead persons.

As can be seen, the stretcher is arranged at a height that allows convenient access to the person on the stretcher. The person is transported in the desired plane. The desired plane may be horizontal, but also other planes, like feet down or head down, side tipped orientations of the person, etc., depending on the care needed of the person. As the person is maintained in this plane, independent of the terrain, easy access of accompanying medical personal to the person is provided, even during transportation. This saves valuable transportation time needed by ill or wounded persons, as acute treatment may be performed during the entire transport, and no pauses are needed for this purpose.

Sensitive equipment may include telecommunication equipment, e.g. including a paraboloidal aerial or satellite dish. The compensation unit may be used to maintain a telecommunications link between the aerial and a satellite or other base station.

Alternatively, or in addition, the desired plane may be changed and adjusted during operation of the vehicle, e.g. during acceleration or deceleration.

For instance, the payload carrying surface may be positioned further to an end of the rails in order to allow convenient loading and unloading. For instance a passenger in a seat affixed to the payload carrying surface, may thus more conveniently get actively or passively with assistance into and out of the seat.

For instance the inclination of a seat surface 301 or a backrest 302 to prevent forward tipping of a passenger. A sensor, like the aforementioned inclinometer or gyro, or proximity sensors, etc., may detect a collision of the vehicle, e.g. bumping into a wall. In order to increase security of the passenger, the seat may be inclined opposite to the direction of collision. This inclination may be done upon detection of the collision, or prior thereto as a precautionary measure in case the sensors provide a pre-collision indicating signal.

Hence, the compensation system is capable of compensating changes in angular momentum which the vehicle and payload are exposed to. For instance during transportation, e.g. during acceleration phases a seat surface and/or backrest are moved in such manner that the payload is tilted slightly forward, related to the direction of movement, to maintain or improve stability. Consequently when the vehicle and payload are exposed to deceleration the seat surface and/or backrest are moved slightly backward, related to the direction of movement. The later may occur while the transportation unit 10 encounters some obstacle that is not being suspended away, e.g. a branch on the ground, a boulder, a curb, etc.

Although this seat surface and/or backrest compensation above only is described in forward vs. backward direction in relation to the direction and movement of transportation, the compensation may equally be provided to compensate for angular momentum in sideways directions, i.e. perpendicular to the forward-aft direction of the vehicle. A superimposed combination of these perpendicular compensation directions yields a compensation, in all directions, within the chosen desired 2-dimensional plane into which the payload is controlled by the compensation system in general terms.

The cargo carrying plane 250 may also controllably adjusted to a fixed orientation with reference to a remote point, e.g. the payload may be a beacon for topographic measurements that constantly is oriented towards a remote measurement unit.

Sliding movement of the vehicle 1, e.g. due to slippery ground, may be compensated in real time by the compensation system 20 with reference to the payload surface 250.

In an emergency condition, the compensation system 20 may fail to operate, such as if a power failure should occur. When such a condition is detected, the compensation system 20 may be locked, thereby forming a rigid connection between the transportation body 10 and the payload receiving unit 30. For instance an electric or pneumatic actuator may be activated during ordinary operation that unlocks a friction brake. If power or pressure to the actuator is interrupted, a mechanical spring displaces the friction brake in such a manner that it locks the compensation system 20.

While a rail based compensation system is shown for coupling the transportation body 10 to the payload receiving unit 30, the use of any flexible linkage in place of the rails 211, 212, 221, 222, 231, 232 may be provided additionally or alternatively in other embodiments.

Figure 17:
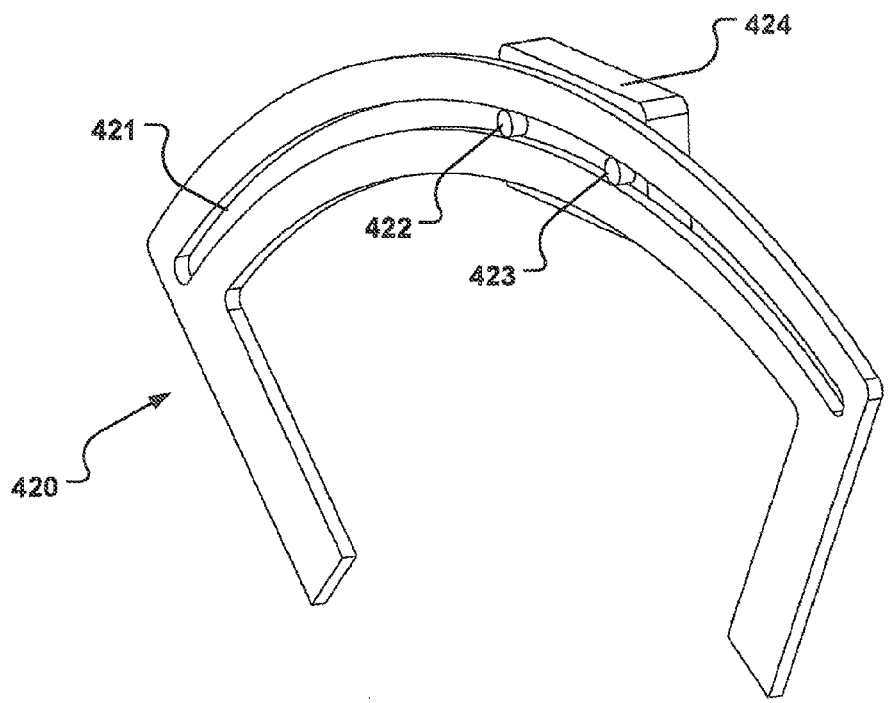

Alternatively to rails in the rail based compensation system, equivalent transfer units may be provided, including flat elongate sheets or plates, plates including recesses or protrusions, etc. An example is shown in FIG. 17, where a transfer unit is provided in the form of a flat sheet 420 that comprises a slit 421. An engagement unit 424 is slidably movable along the sheet 420, supported by the slit 421. Wheels or rollers 422, 423 arranged in the slit 421 carry the engagement unit 424 slidably along the slit 421.

The rails may have different cross section than circular, e.g. oval, T-shaped, U-shaped, etc. Also, the number of rails may be different than the illustrated pairs of rails. For instance three or four parallel rails, or a central single rail may be provided as a transfer unit of one or more of the compensation units.

Figure 16:
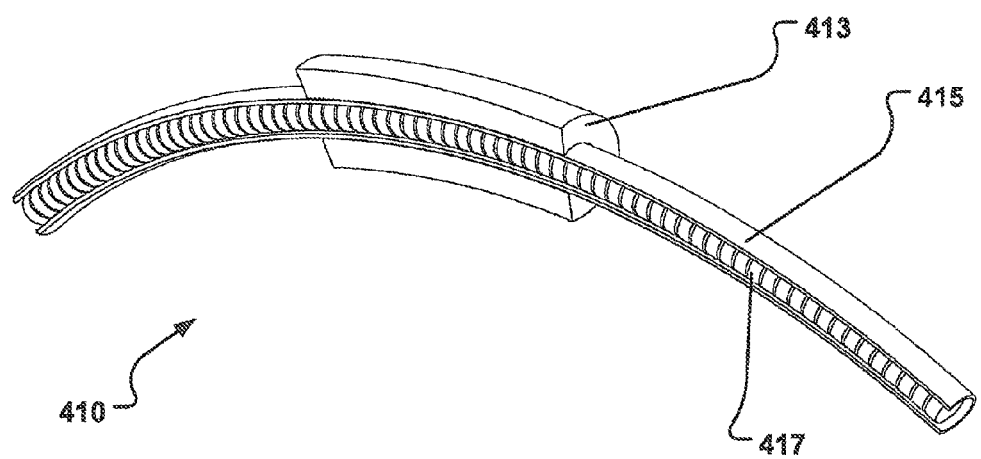
FIGS. 16 and 17 show alternative transfer units.

Alternatively, or in addition to separate actuators, a linear motor may be provided as an integrated part of the rails. The rails may comprise permanent magnetic elements and an anchor element lifts and transports the respective units relative the respective rail. An example of an alternative transfer unit is shown in FIG. 16, where a linear drive transfer unit 410 permanent magnets 417 are arranged in a shell 415 along which an anchor 413 is axially movable.

Some examples of dimension ranges of embodiments and ranges of ratios thereof are given below, without limiting the invention to these embodiments in any way.

The payload surface may have a height from 60 cm to 90 cm, such as typically 80 cm. The wheelbase of a vehicle 1 may be in the range of 40 cm to 80 cm, such as typically 50 cm. The wheels may have a diameter between 30 cm to 50 cm, such as typically 40 cm. The distance of wheels from left to right (width) may be in the range of 40 cm to 70 cm, such as typically 60 cm. The footprint area of the vehicle may be in the range of approximately 0.9 to 0.3 m2, such as typically 0.5 m2. Curvatures of rails are chosen correspondingly. A wheelbase to payload surface height ratio may be in the range of 0.5 to 1.33. The vehicle may have a weight of as low as 40 kg to 60 kg, which is very lightweight having regard to the operational range and potential payload. The vehicle including compensation system, without payload may be dimensioned to carry a payload up to 130 kg. A ratio of the weight of the payload to the weight of the vehicle may be in the range of 3 to 1. Compensation ranges in terrain angles that may be travelled may be between 0 up to 70 degrees (e.g. thanks to the expanding capabilities provided by at least one expandable or extendable unit as described above) from horizontal, such as 50, 60, or 70 degrees. This characterizes a very compact, energy efficient, vehicle capable of carrying high payload in extreme terrain.

The following are the original claims from the parent PCT application for future reference:

x1. A transportation apparatus (1), said apparatus comprising
a payload receiving unit (30), a transportation body (10), and a controllable compensation system (20) arranged there between and devised to allow adjustment of a desired spatial relationship between a payload surface (250) of said compensation system (20) for attachment of said payload receiving unit (30) and a transportation surface (150) of said transportation body (10), wherein
said compensation system (20) comprises at least a first compensation unit (210) and a second compensation unit (230) arranged for adjustment of said spatial relationship, wherein said
first compensation unit (210) is arranged for adjustment of said spatial relationship in a first direction and said second compensation unit is arranged for adjustment of said spatial relationship in a second direction different from said first direction, whereby said compensation system (20) is adapted to maintain a desired orientation of said payload surface (250) substantially independent of changes of orientation of said transportation surface (150) of said transportation apparatus (1),
wherein said compensation system (20) is adapted to substantially maintain a common point of gravity of said transportation apparatus (1) including a payload by displacing a center of gravity of said payload receiving unit (30) and said payload substantially opposite to a displacement of a center of gravity of said transportation apparatus (1), and
wherein at least one of said first and/or second compensation units are extendable from at least one end thereof during operation.

x2. The transportation apparatus according to claim x1, wherein said first and second compensation units are arranged in series to each other.

x3. The transportation apparatus according to claim x1 or x2, wherein said first and second compensation units are attached to each other.

x4. The transportation apparatus according to any of the preceding claims x1-x3, wherein said first and second compensation units comprise at least one curved rail each having a curvature and being arranged in a crossed configuration.

x5. The transportation apparatus according to claim x4, wherein said at least one curved rail is an in gravitational direction downwardly open curved rail having a circular curvature.

x6. The transportation apparatus according to claim x4 or x5, wherein said curvature of said rails is chosen such that said common point of gravity is situated below said transportation apparatus, and wherein said curvature is continuous without a straight portion.

x7. The transportation apparatus according to claim 6, wherein said at least one rail of said first compensation unit is arranged at a different height than said at least one rail of said second compensation unit, and wherein said rails of said compensation units have different curvatures having a common virtual center point.

x8. The transportation apparatus according to any of claims x4 to x7, wherein said curvature of said at least one rail is chosen to be of a radius with its centre point placed at the average rotation point of said vehicle on the middle part of the rails.

x9. The transportation apparatus according to any of claims x4 to x8, wherein said curvature of said rails is adapted to an individual mass and distribution of a payload to be carried by said payload surface (250).

x10. The transportation apparatus according to any of the preceding claims x1-x9, wherein said compensation system is configured to operate partly passively based on inertia movement of said payload unit (30) relative said transportation unit (10).

x11. The transportation apparatus according to claim x10, wherein said compensation unit comprising breaking or damping elements that are actively controllable.

x12. The transportation apparatus according to any of the preceding claims x1-x11, wherein said compensation system is configured to operate with proportional extensions of the first and second compensation units.

x13. The transportation apparatus according to any of the preceding claims x1-x12, wherein said compensation system comprises at least one active controllable drive mechanism configured to provide active movement support of said first and second compensation unit to adapt said desired plane of said payload surface (250) in reaction to changes of orientation of said transportation surface (150) in real time.

x14. The transportation apparatus according to any of the preceding claims x1-x13, wherein said compensation system comprises a sensor actuator unit configured to provide a control feedback loop for said adjustment in real time.

x15. The transportation apparatus according to claim x14, wherein said sensor actuator unit comprises at least two sensor systems, including a first sensor system adapted to provide a payload surface measurement value for the orientation in space of said payload supporting surface, and a second sensor system adapted to provide a transportation surface measurement value for the orientation in space of said transportation surface, wherein said control feedback loop has a difference between said payload surface measurement value and said transportation surface measurement value as a feedback value.

x16. The transportation apparatus according to any of the preceding claims x1-x15, wherein said transportation apparatus is adapted to travel along a topography with said transportation surface (150) having an angle in the range of 0 to 70 degrees in relation to a horizontal plane.

x17. The transportation apparatus according to any of the preceding claims x1-x16, wherein said first direction and said second direct are perpendicular to each other.

x18. The transportation apparatus according to any preceding claim x1-x17, wherein said transportation apparatus is a land based vehicle having at least two axis with at least two wheels each, and a wheelbase between said axis.

x19. The transportation apparatus according to claim x18 dependent on claim x17, wherein said compensation unit is adapted to keep said common point of gravity in the vicinity of a center point of said wheelbase.

x20. The transportation apparatus according to any of the preceding claims x1-x19, wherein said transportation apparatus is a water carried apparatus, or an airborne apparatus.

21. The transportation apparatus according to any of the preceding claims x1-x20, wherein said payload surface is adapted to receive interchangeable payloads and comprises a fastening unit.

x22. The transportation apparatus according to claim x20, wherein said fastening unit is fastened to a seat for receiving a person, and wherein said desired plane is a substantially horizontal plane of a seat surface of said seat.

x23. The transportation apparatus according to claim x21, wherein said fastening unit is fastened to a cargo carrier, including a stretcher.

x24. A method of substantially sustaining an orientation of payload surface (250) of a payload receiving unit (30) of transportation apparatus (1), independent of changes of orientation of a transportation surface (150) of a transportation body (10) of said transportation apparatus (1) in motion, said method comprising real-time adjustment of a desired spatial relationship between said payload surface (250) and said transportation surface (150) by means of said compensation unit (20) attached to said payload receiving unit (30) and said transportation body (10), wherein said real-time adjustment comprises adjustment of said spatial relationship with at least a first compensation unit (210) and a second compensation unit (230) of said compensation system (20), and adjustment of said spatial relationship in a first direction by said first compensation unit (210), and adjustment of said spatial relationship in a second direction different from said first direction by said second compensation unit (230), including expanding said first and/or second compensation unit during operation, and substantially maintaining a common point of gravity of said transportation apparatus (1) including a payload by displacing a center of gravity of said payload receiving unit (30) and said payload with said compensation system (20) substantially opposite to a displacement of a center of gravity of said transportation apparatus (1).

x25. The method according to claim x24, wherein said compensation is made vibration free in a rugged terrain environment with a stabilized desired plane of said payload surface (250).

x26. The method according to claim x24 or x25, wherein said compensation system provides a displacement of said payload surface (250) while maintaining said desired plane in a direction opposite of a direction center of gravity displacement of said transportation body (10).

x27. The method according to claim x26, wherein said compensation comprises an automatic proportional adjustment of said first compensation unit (210) and said second compensation unit (230) with regard to maintaining a common center of mass of said transportation apparatus (1) including a payload.

x28. The method according to any of claims x24 to x27, wherein said transportation apparatus is a transportation apparatus (1) according to any of claims x1 to x25.

x29. A computer program for processing by a computer and storable on a computer-readable medium for substantially sustaining an orientation of payload surface (250) of a payload receiving unit (30) of transportation apparatus (1), independent of changes of orientation of a transportation surface (150) of a transportation body (10) of said transportation apparatus (1) in motion, said computer program comprising a code segment for real-time adjustment of a desired spatial relationship between said payload surface (250) and said transportation surface (150) by means of said compensation unit (20) attached to said payload receiving unit (30) and said transportation body (10), wherein said real-time adjustment comprises adjustment of said spatial relationship with at least a first compensation unit (210) and a second compensation unit (230) of said compensation system (20), and a code segment for adjustment of said spatial relationship in a first direction by said first compensation unit (210), and adjustment of said spatial relationship in a second direction different from said first direction by said second compensation unit (230), and a code segment for substantially maintaining a common point of gravity of said transportation apparatus (1) including a payload by displacing a center of gravity of said payload receiving unit (30) and said payload with said compensation system (20) substantially opposite to a displacement of a center of gravity of said transportation apparatus (1).

x30. The computer program of claim x29 enabling carrying out of a method according to claims x24 to x28.

x31. A transportation apparatus comprising a compensation system as comprised in claim x1, wherein the transportation apparatus has a footprint area in the range of 0.9 to 0.3 m2, a wheelbase to payload surface height ratio in the range of 0.5 to 1.33, a ratio of a weight of a payload to a weight of the transportation apparatus in the range of 3 to 1, and compensation ranges in terrain angles up to 70 degrees from horizontal in all planes.

x32. A compensation system (20) arranged between a payload receiving unit (30) and a transportation body (10), devised to allow adjustment of a desired spatial relationship between a payload surface (250) of said compensation system (20) for attachment of said payload receiving unit (30) and a transportation surface (150) of said transportation body (10), said system (20) comprising at least a first compensation unit (210) arranged for adjustment of said spatial relationship in a first direction, wherein said compensation system (20) is adapted to maintain a desired orientation of said payload surface (250) in said first direction substantially independent of changes of orientation of said transportation surface (150) of said transportation apparatus (1) in said first direction, and wherein said first compensation unit (210) is extendable from at least one end thereof during operation.

x33. The system of claim x32, comprising a second compensation unit (230) arranged for adjustment of said spatial relationship, wherein said second compensation unit is arranged for adjustment of said spatial relationship in a second direction different from said first direction.

x34. The system of claim x33, wherein said second compensation unit is extendable from at least one end thereof during operation.

x35. The system of claim x34, whereby said compensation system (20) is adapted to maintain a desired orientation of said payload surface (250) substantially independent of changes of orientation of said transportation surface (150) of said transportation apparatus (1), and wherein said compensation system (20) is adapted to substantially maintain a common point of gravity of said transportation apparatus (1) including a payload by displacing a center of gravity of said payload receiving unit (30) and said payload substantially opposite to a displacement of a center of gravity of said transportation apparatus (1), x36. The system of any of claims x33 to x35, wherein said first and/or said second compensation unit comprises at least one curved rail having a curvature, and wherein said extendable capability is provided by a telescopic arrangement of said curved rail.

x37. The system of claim x36, wherein said first and second compensation units being arranged in a crossed configuration.

x38. The system of any of the preceding claims x36-x37, wherein said curvature of said rails is chosen such that said common point of gravity is situated below said transportation apparatus, and wherein said curvature is continuous without a straight portion.

x39. The system of any of the preceding claims x32-x38, wherein said compensation system is configured to operate partly passively based on inertia movement of said payload unit (30) relative said transportation unit (10).

x40. The system of claim x39, wherein said compensation unit comprising breaking or damping elements that are actively controllable.

x41. The system of any of the preceding claims x32-x40, wherein said compensation system is configured to operate with proportional extensions of at least the first compensation unit.

x42. The system of any of preceding claims x33-x38, wherein said extendable capability is provided by an extension unit allowing a relative movement of the first compensation unit (210) to the second compensation unit.

x43. The system of claim x42, wherein said relative movement is proportional.

x44. The system of any of the preceding claims x32-x43, wherein said compensation system comprises at least one active controllable drive mechanism configured to provide active movement support of said first and second compensation unit to adapt said desired plane of said payload surface (250) in reaction to changes of orientation of said transportation surface (150) in real time.

x45. A transportation apparatus (1), said apparatus comprising said system of any of claims x32-x44.

x46. The apparatus of claim x43, wherein said apparatus is said apparatus of any of claims x1-x23.

The present invention has been described above with reference to specific embodiments. However, other embodiments than the above described are equally possible within the scope of the invention. Different method steps than those described above, performing the method by hardware or software, may be provided within the scope of the invention. The different features and steps of the invention may be combined in other combinations than those described. The compensation system may be used in other applications, e.g. compensating or mitigating effects of rough sea. The scope of the invention is only limited by the appended patent claims.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method of sustaining an orientation of payload surface (250) of a payload receiving unit (30) of transportation apparatus (1), independent of changes of orientation of a transportation surface (150) of a transportation body (10) of said transportation apparatus (1) in motion, said method comprising:

real-time adjustment of a desired spatial relationship between said payload surface (250) and said transportation surface (150) by a compensation system (20) attached to said payload receiving unit (30) and said transportation body (10), wherein said real-time adjustment comprises adjustment of said spatial relationship with at least a first compensation unit (210) and a second compensation unit (230) of said compensation system (20), and adjustment of said spatial relationship in a first direction by said first compensation unit (210) along a rail, and adjustment of said spatial relationship in a second direction different from said first direction by said second compensation unit (230) along a second rail, and maintaining a common point of gravity of said transportation apparatus (1) including a payload by displacing a center of gravity of said payload receiving unit (30) and said payload with said compensation system (20) opposite to a displacement of a center of gravity of said transportation apparatus (1), and moving said payload surface along a first and second curvature independently in a translatory motion with said first and second compensation units.

2. The method according to claim 1, wherein said compensation system provides a displacement of said payload surface (250) while maintaining a desired plane in a direction opposite of a direction center of gravity displacement of said transportation body (10).

3. The method according to claim 2, wherein said compensation comprises an automatic proportional adjustment of said first compensation unit (210) and said second compensation unit (230) with regard to maintaining a common center of mass of said transportation apparatus (1) including a payload.

4. A non-transitory computer-readable medium storing a computer program for processing by a computer, said computer program comprising:

a code segment for real-time adjustment read by the computer from the non-statutory computer-readable medium and executed by the computer, the computer making real-time adjustment of a desired spatial relationship between a payload surface (250) and a transportation surface (150) by a compensation system (20) attached to a payload receiving unit (30) of a transportation body (10) of a transportation apparatus (1), wherein said real-time adjustment comprises adjustment of said desired spatial relationship with at least a first compensation unit (210) and a second compensation unit (230) of said compensation system (20), and a code segment for adjustment of said spatial relationship read by the computer from the non-statutory computer-readable medium and executed by the computer, the computer making said spatial adjustment in a first direction by said first compensation unit (210), and adjustment of said spatial relationship in a second direction different from said first direction by said second compensation unit (230), and a code segment for maintaining a common point of gravity read by the computer from the non-statutory computer-readable medium and executed by the computer, the computer maintaining a common point of gravity of said transportation apparatus (1) including a payload by displacing a center of gravity of said payload receiving unit (30) and said payload with said compensation system (20) opposite to a displacement of a center of gravity of said transportation apparatus (1), and moving said payload surface along a first and second curved rail independently in a translatory motion with said first and second compensation units.

5. A transportation apparatus (1), said apparatus comprising:

a payload receiving unit (30), a transportation body (10), and a compensation system (20) arranged there between and devised to allow adjustment of a desired spatial relationship between a payload surface (250) of said compensation system (20) for attachment of said payload receiving unit (30) and a transportation surface (150) of said transportation body (10), wherein said compensation system (20) comprises at least a first compensation unit (210) and a second compensation unit (230) arranged for adjustment of said spatial relationship, wherein said first compensation unit (210) is arranged for adjustment of said spatial relationship in a first direction and said second compensation unit is arranged for adjustment of said spatial relationship in a second direction different from said first direction, whereby said compensation system (20) is configured to maintain a desired orientation of said payload surface (250) independent of changes of orientation of said transportation surface (150) of said transportation apparatus (1), wherein said compensation system (20) maintains a common point of gravity of said transportation apparatus (1) including a payload by displacing a center of gravity of said payload receiving unit (30) and said payload opposite to a displacement of a center of gravity of said transportation apparatus (1), and wherein said first compensation unit provides translational movement along a first rail of said payload surface along a first curvature, and said second compensation unit provides translational movement along a second rail of said payload surface along a second curvature, both independently.

6. The transportation apparatus according to claim 5, wherein said first and second compensation units are arranged in series.

7. The transportation apparatus according to claim 5, wherein said first and second compensation units are attached to each other.

8. The transportation apparatus according to claim 5, wherein said first and second compensation units comprise at least one curved rail each having a curvature and being arranged in a crossed configuration.

9. The transportation apparatus according to claim 8, wherein said at least one curved rail is an in gravitational direction downwardly open curved rail having a circular curvature.

10. The transportation apparatus according to claim 8, wherein said curvature of said rails is chosen such that said common point of gravity is situated below said transportation apparatus, and wherein said curvature is continuous without a straight portion.

11. The transportation apparatus according to claim 10, wherein said at least one rail of said first compensation unit is arranged at a different height than said at least one rail of said second compensation unit, and wherein said rails of said compensation units have different curvatures having a common virtual center point.

12. The transportation apparatus according to claim 5, wherein said compensation system comprises a sensor actuator unit configured to provide a control feedback loop for said adjustment in real time, wherein said sensor actuator unit comprises at least two sensor systems, including a first sensor system configured to provide a payload surface measurement value for the orientation in space of said payload supporting surface, and a second sensor system configured to provide a transportation surface measurement value for the orientation in space of said transportation surface, wherein said control feedback loop has a difference between said payload surface measurement value and said transportation surface measurement value as a feedback value.

13. The transportation apparatus according to claim 5, wherein said transportation apparatus is configured to travel along a topography with said transportation surface (150) having an angle in the range of 0 to 70 degrees in relation to a horizontal plane.

14. The transportation apparatus according to claim 5, wherein said first direction and said second direction are perpendicular to each other.

15. The transportation apparatus according to claim 5, wherein said transportation apparatus is a land based vehicle having at least two axis with at least two wheels each, and a wheelbase between said axis.

16. The transportation apparatus according to claim 15, wherein said compensation system is configured to keep said common point of gravity within said wheelbase.

17. The transportation apparatus according to claim 5, wherein said fastening unit is fastened to a seat for receiving a person, and wherein said desired orientation is a horizontal plane of a seat surface of said seat.

\* \* \* \* \*